United States Patent [19]
Hibino

[11] Patent Number: 5,994,787
[45] Date of Patent: Nov. 30, 1999

[54] CONTROL SYSTEM FOR A POWER SUPPLY CHANGEOVER SWITCH

[75] Inventor: Masahiko Hibino, Susono, Japan

[73] Assignee: Toyota Jidosha Kabushiki Kaisha, Aichi-ken, Japan

[21] Appl. No.: 08/929,733

[22] Filed: Sep. 15, 1997

[30] Foreign Application Priority Data

Sep. 19, 1996 [JP] Japan .................................... 8-247698

[51] Int. Cl.[6] ....................................................... F01N 3/10
[52] U.S. Cl. ............................ 307/10.1; 60/300; 219/205
[58] Field of Search .................................... 307/9.1, 10.1, 307/10.7, 38, 39, 41, 130, 139, 140, 153; 392/485, 491; 60/300, 284; 219/202, 205; 322/64–66, 62, 63; 361/18, 21; 320/124, 128, 162, 163, 137, 165, DIG. 10

[56] References Cited

U.S. PATENT DOCUMENTS

| | | | |
|---|---|---|---|
| 4,084,126 | 4/1978 | Clements | 307/10.7 |
| 5,404,720 | 4/1995 | Laing | 60/284 |
| 5,512,789 | 4/1996 | Lyon | 307/10.1 |

FOREIGN PATENT DOCUMENTS

| | | |
|---|---|---|
| 52-111131 | 9/1977 | Japan . |
| 55-63600 | 5/1980 | Japan . |
| 55-157942 | 12/1980 | Japan . |

OTHER PUBLICATIONS

SAE 941042, "Development of an Alternator–Powered Electrically–Heated Catalyst System", Paul M. Laing. (May 1994).

SAE 960342, "Study on Conformity Technology with ULEV EHC System", Yuichi Shimasaki, et al. (Date unknown).

Primary Examiner—Richard T. Elms
Attorney, Agent, or Firm—Kenyon & Kenyon

[57] ABSTRACT

In the control system for a power supply changeover switch, a battery and an electrically heated catalytic converter (EHC) are connected to an alternator in a parallel arrangement via a changeover switch. The changeover switch selectively takes either of a first position where the battery is connected to the alternator and a second position where the EHC is connected to the alternator. An electronic control unit (ECU) is provided for controlling the changeover switch and the alternator. When the changeover switch is to be switched between the first and the second position, the ECU first terminates the power generation of the alternator and, then, performs the switching of the changeover switch 25 after the electric current flowing through the changeover switch 25 decreases to a sufficiently low value. Since the switching of the changeover switch 25 is performed always in the condition where the electric current flowing through the changeover switch is low, a failure of the changeover switch 25 such as welding of the contacts in the switch caused by cutting off a large electric current does not occur.

8 Claims, 16 Drawing Sheets

CONTROL SYSTEM FOR A POWER SUPPLY CHANGEOVER SWITCH

BACKGROUND OF THE INVENTION

1. Field of the Invention

The present invention relates to a control system for a power supply changeover switch. More specifically, the present invention relates to a control system which is capable of preventing a failure of a power supply changeover switch such as welding of the contacts of the switch.

2. Description of the Related Art

In a power supply system provided with an electric generator and a battery charged by the generator, such as in a power supply system for a vehicle, a power supply changeover switch (hereinafter referred to as "a changeover switch") is used for supplying electric power to a specific large electric load (a load such as an electric heater which consumes a large amount of electric power). In this type of the system, the changeover switch disconnects the battery from the generator and, at the same time, directly connects the large electric load to the generator so that electric power is directly supplied from the generator to the large electric load.

This type of the power supply system is, for example, disclosed in Japanese Unexamined Patent Publication (Kokai) No. 52-111131. The '131 publication discloses a power supply system for a vehicle which supplies electric power to an electric heater of a defogger for removing fog and ice from a windshield of the vehicle. In the system of the '131 publication, the defogger is directly connected to a generator of the vehicle when the defogger is operated, and a battery is disconnected from the generator in order to supply a large electric power to the defogger.

In general, when a battery is connected to a generator, the output voltage of the generator is controlled at a value lower than a predetermined battery charging voltage to prevent an overcharge of the battery. Therefore, if a large electric load such as a defogger and the battery are connected to the generator at the same time, the output voltage of the generator must be controlled at a relatively low value. In this case, since the output voltage of the alternator is low, the electric current and electric power supplied to the electric load also becomes low. This causes insufficient heat generation of the heater and, thereby, the time required for removing fog and ice is prolonged. In the system of the '131 publication, it is possible to set the resistance of the heater of the defogger at a low value to supply a large electric power to the defogger. However, in this case, since the output power of the generator is relatively low due to its low output voltage, the generator cannot supply sufficient electric power to the defogger, and the battery must supply electric power to the defogger in order to make up the shortage of electric power required by the defogger and, thereby, damage to the battery may occur.

In order to solve this problem, the system in the '131 publication disconnects the battery from the generator when the defogger is activated, in order to raise the output voltage of the generator. By raising the output voltage, since the output power of the generator increases accordingly, a sufficient electric power is supplied to the defogger. Further, since the battery is disconnected from the generator, the overcharge of the battery does not occur even though the output voltage of the generator is raised. Namely, in the system of the '131 publication, a large electric power can be supplied to a specific load without increasing the load of the battery.

In the system which selectively connects a battery and a specific load to the generator as disclosed in the '131 publication, a changeover switch is used for switching the connections of the battery and the specific load to the generator. In general, a large capacity mechanical switch (relay switch) is used when a large electric current must be switched. However, since a large electric current must be cut off instantaneously in the changeover switch, welding of the contacts in the switch sometimes occurs. If the welding of the contacts of the changeover switch occurs at the position where it connects the electric load to the generator, for example, the electric load may be damaged due to an excessive power supply and, since the battery is not charged, an excessive discharge of the battery may occur. Further, if welding of the contacts occur at the position of the changeover switch where it connects the battery to the generator, electric power cannot be supplied to the load and, in addition to that, overcharging of the battery may occur when the output voltage of the generator is raised.

It is possible to use a large capacity semiconductor relay switch, in lieu of a mechanical relay switch, for a changeover switch. However, if a large electric current is switched by a semiconductor relay, a dielectric breakdown of the semiconductor may occur, and a similar problem as in the mechanical relay switch may occur.

In general, it is effective to enlarge the contact area of the contacts in the mechanical switch for preventing the welding of the contacts. However, even if the contact area is enlarged, the contacts become liable to welding when the resistance of the contacts increases due to an increase in the roughness of the contact surface after a number of ON/OFF operation of the switch and the same problem may occur. Further, the dielectric breakage can be prevented if a large capacity flywheel diode is connected to the semiconductor relay switch. However, since a large capacity semiconductor relay switch is costly itself and, if a large capacity flywheel diode is required, the manufacturing cost of the changeover switch becomes intolerably high.

SUMMARY OF THE INVENTION

In view of the problems in the related art as set forth above, the object of the present invention is to provide a control system for a power supply changeover switch which is capable of preventing the welding of the contacts of a mechanical relay switch as well as the dielectric breakage of a semiconductor relay switch when these switches are used for switching the connection of a battery and an electric load to a generator in a simple and inexpensive manner.

This object is achieved by a control system for a power supply changeover switch according to one aspect of the present invention, which comprises an electric generator, a battery, an electric load, a changeover switch which selectively takes a first position which connects the battery to the generator and a second position which connects the electric load to the generator, power supply control means for terminating a power generation of the generator when the switching of the changeover switch is required, and switching means for switching the changeover switch between the first and the second position when an electric current flowing through the changeover switch becomes lower than a predetermined value after the power supply control means terminates the power generation.

According to this aspect of the invention, the power generation of the generator is terminated by the power supply control means, and the electric current flows through the changeover lowers accordingly. Further, the switching means switches the changeover switch when the electric current flowing through the changeover switch becomes lower than a predetermined value. This predetermined value of the electric current is set at a value sufficiently lower than an electric current which causes an arc between the contacts during the switching operation if a mechanical relay switch is used, or sufficiently lower than an electric current which causes dielectric breakdown of the semiconductor due to a counter electromotive force caused by the switching operation if a semiconductor relay switch is used. Therefore, since the switching operation is performed when the electric current is sufficiently low, the failure of the switch, such as the welding of the contact or the dielectric breakdown of the semiconductor does not occur in this aspect of the invention.

According to another aspect of the present invention, there is provided a control system for a power supply changeover switch comprising, an electric generator, a battery, an electric load, a changeover switch which selectively takes a first position which connects the battery to the generator and a second position which connects the electric load to the generator, power supply control means for terminating a power generation of the generator when the switching of the changeover switch is required, and switching means for switching the changeover switch between the first and the second positions, wherein said switching means switches the changeover switch from the first position to the second position when the electromotive force of the generator becomes lower than a voltage of the battery after the power supply control means terminates the power generation.

According to this aspect of the invention, it is determined whether the electric current is flowing through the switch based on the electromotive force of the generator, and switching operation is performed when it is determined that no electric current flows through the switch. For example, when an AC output of the generator is converted to a DC output by a rectifier (such as a diode rectifier), no electric current flows through between the battery and the generator in the first position of the changeover switch (where the battery is connected to the generator) when the electromotive force of the generator (i.e., input voltage of the rectifier) becomes lower than the battery voltage. Therefore, no electric current flows through the changeover switch in this condition.

In this aspect of the invention, since the switching of the changeover switch from the first position to the second position is performed when the electromotive force of the generator becomes lower than the battery voltage, the switching operation is performed in the condition where no electric current flows through the changeover switch. Therefore, the failure of the switch, such as the welding of the contacts or the dielectric breakage of the semiconductor does not occur.

BRIEF DESCRIPTION OF THE DRAWINGS

The present invention will be better understood from the description as set forth hereinafter, with reference to the accompanying drawings in which.

DESCRIPTION OF THE PREFERRED EMBODIMENT

Hereinafter, an embodiment of the present invention will be explained in detail with reference to the accompanying drawings.

Figure 1:
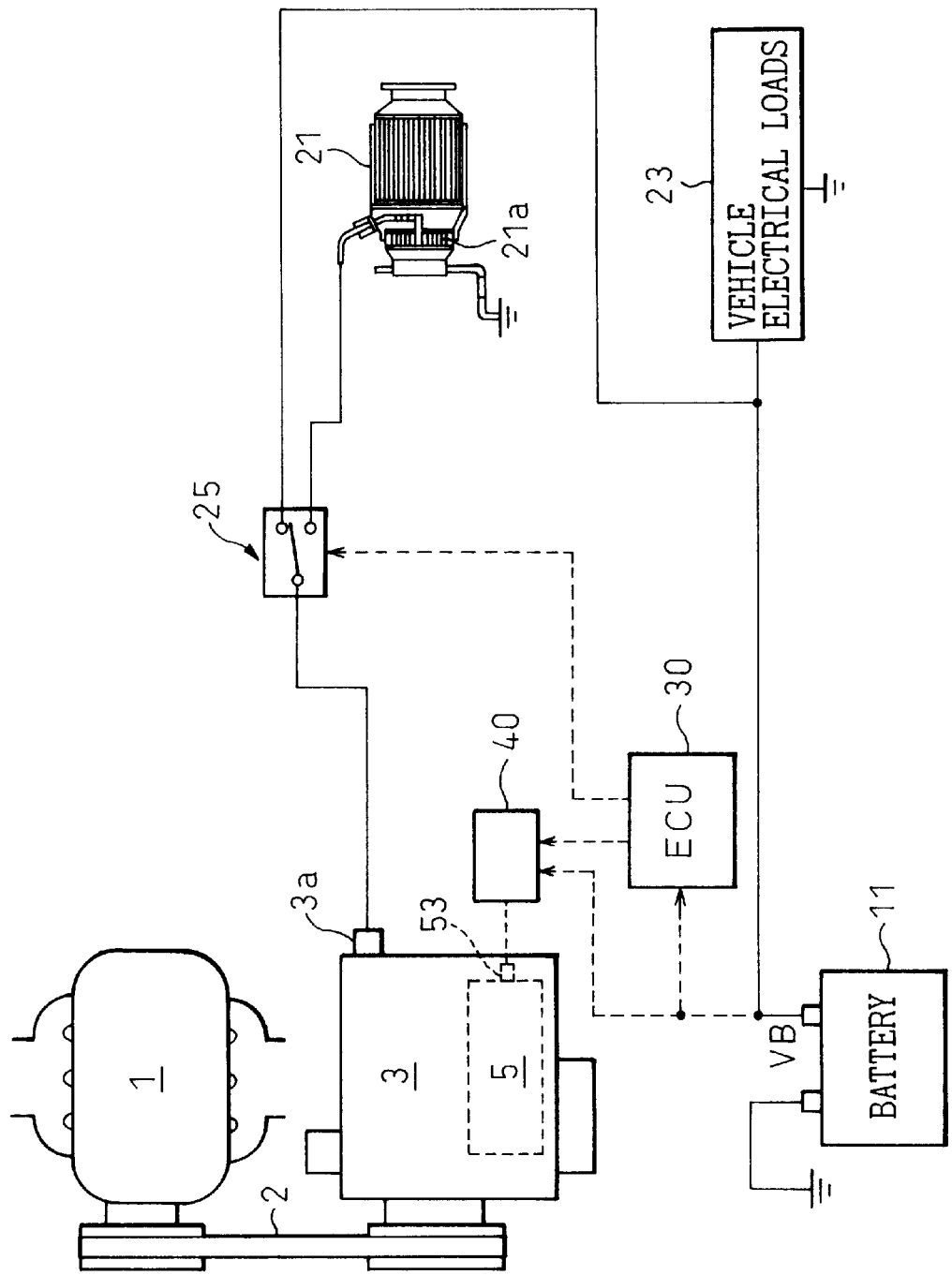
FIG. 1 schematically illustrates the general configuration of an embodiment of the present invention when it is applied to a vehicle power supply system.
Figure 2:
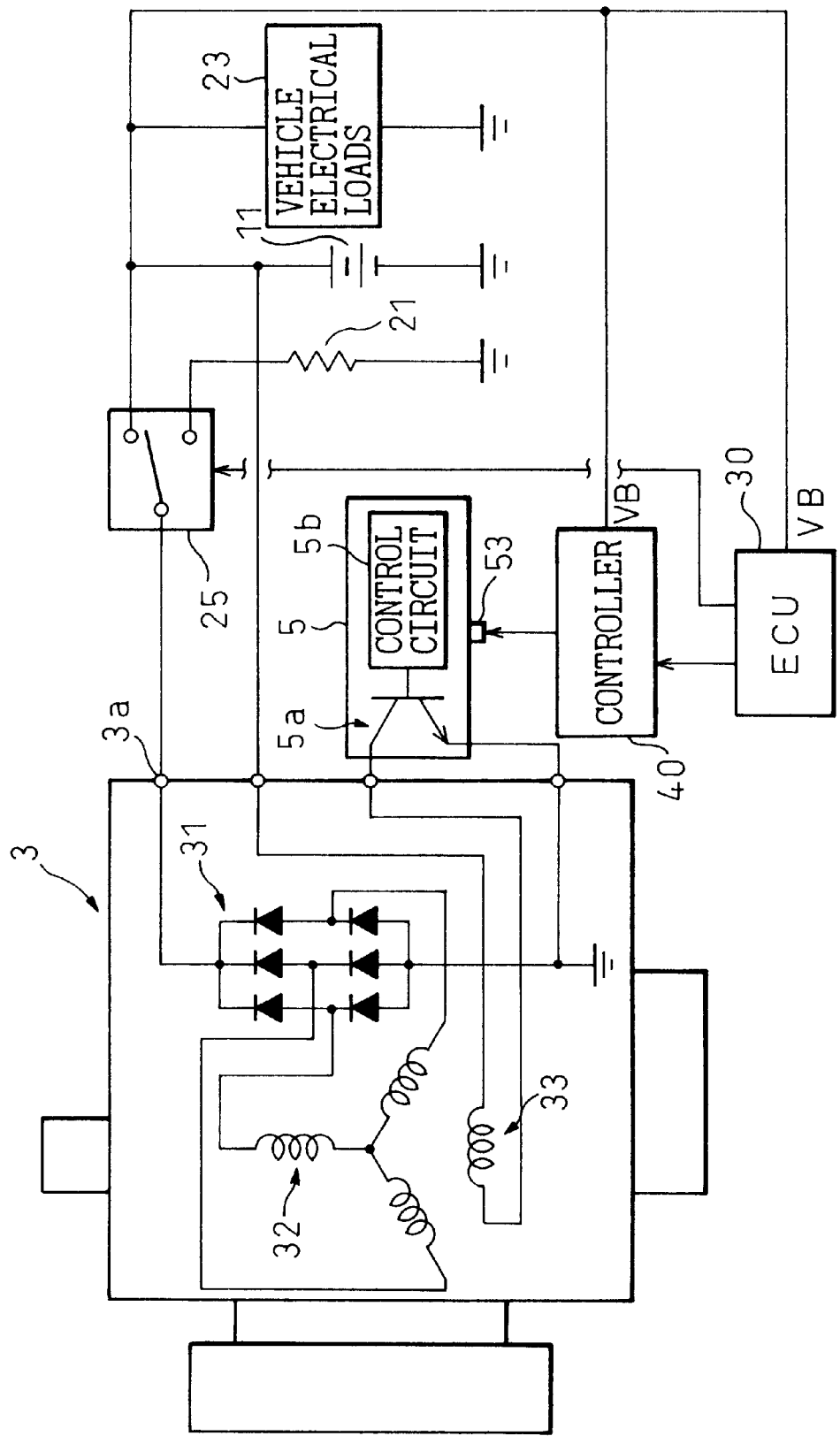
FIG. 2 is a circuit diagram of an embodiment of the power supply system used in the embodiment in FIG. 1.

FIG. 1 shows a general configuration of an embodiment of the present invention when it is applied to a power supply system of a vehicle, and FIG. 2 is a circuit diagram of the power supply system in FIG. 1.

In FIG. 1, reference numeral 1 designates an internal combustion engine of a vehicle, and numeral 3 designates a three-phase AC generator (an alternator) driven by an output shaft of the engine 1 via a belt 2.

As shown in FIG. 2, the alternator 3 is provided with a built-in diode rectifier 31 which converts a three-phase AC output of the stator coils 32 of the alternator 3 into a DC output and supplies it to an output terminal 3a. The alternator 3 is further provided with a built-in voltage regulator 5 which controls a field current flowing through a rotor field coil 33 of the alternator 3. Numeral 40 in FIGS. 1 and 2 is a controller 40 which controls the regulator 5. The functions of the regulator 5 and the controller 40 are explained later in detail.

In FIGS. 1 and 2, numeral 11 represents a battery of the vehicle. Numeral 21 is a large electric load which is, in this embodiment, a catalytic converter with an electric heater. The catalytic converter 21 is disposed in an exhaust gas passage of the engine 1 and purifies pollutants in the exhaust gas such as HC, CO and $NO_x$. As shown in FIG. 1, the catalytic converter 21 is provided with an electrically heated catalytic converter (hereinafter, referred to as "an EHC") 21a. The EHC 21a comprises a metal substrate to which catalytic components are attached. When the engine 1 starts, an electric current is supplied to the EHC 21a and, by the electric current flowing through the metal substrate, the substrate generates heat to raise the temperature of the substrate and the catalytic components attached thereto to an activating temperature of the catalytic components. Namely, the metal substrate of the EHC 21a is used as an electric heater for raising the temperature of the catalyst so that the catalytic action thereof starts immediately after the engine is started.

In this embodiment, electric power is supplied to the EHC 21a directly from the alternator 3 in order to raise the temperature of the EHC 21a in a short time without increasing the load of the battery 11. Namely, as shown in FIGS. 1 and 2, the battery 11 and the EHC 21a are connected to the output terminal 3a of the alternator 3 via a changeover switch 25 and the battery 11 and the EHC 21a is selectively connected to the alternator 3 by switching the changeover switch 25.

The changeover switch 25 includes a relay (not shown in the drawing) activated by a changeover signal from an electronic control unit (ECU) 30, and takes either of a first position which connects the battery 11 to the alternator 3 (the position as shown in FIGS. 1 and 2) or a second position which connects the EHC 21a to the alternator 3 in accordance with the changeover signal. Numeral 23 in FIGS. 1 and 2 represents various electric loads of the vehicle such as an ignition circuit of the engine, lamps of the vehicle, an air conditioner. The electric loads 23 in this embodiment are connected to the battery 21 and, when the changeover switch 25 takes the second position which connects the EHC 21a to the alternator, electric power is supplied to the electric loads 23 only from the battery 11.

The ECU 30 in this embodiment may be constructed by a microcomputer and may comprise a central processing unit (CPU), a read-only-memory (ROM), a random-access-memory (RAM) and an input/output interface, all mutually connected by a bi-directional bus. The ECU 30 performs basic control of the engine 1 such as the fuel injection control and the ignition control and, in this embodiment, also acts as various means in the claims such as the power supply control means and the switching means. In order to perform this control, a battery voltage VB is supplied from a positive electrode of the battery 11 to the input/output interface of the ECU 30 via an A/D converter (not shown). Further, the input/output interface of the ECU 30 is connected to the changeover switch 25 and the terminal 41 of the controller 40 in order to supply a changeover signal to the changeover switch 25 and a power supply control signal to the controller 40, respectively.

Next, the functions of the controller 40 and the voltage regulator 5 are explained.

As shown in FIG. 2, the rotor field coil (herein after referred to as "a rotor coil") 33 of the alternator 3 is connected to the battery 11 and the field current is supplied to the rotor coil 33 from the battery 11. Further, the regulator 5 comprises a switching transistor 5a disposed in a field current supply circuit of the rotor coil 33 and a control circuit 5b for controlling the switching transistor 5a. The regulator 5 turns on and off the switching transistor 5a in accordance with a control signal from the controller 40 received at the terminal 53. The controller 40 controls the output voltage of the alternator 3 by adjusting the field current of the rotor coil 33 through the ON/OFF operation of switching transistor 5a.

In this embodiment, the ECU 30 supplies a power supply control signal to the controller 40 in order to control the operation of the controller in accordance with the position of the changeover switch 25. Namely, when the changeover switch 25 is set at a first position which connects the battery 11 to the alternator 3, the ECU 30 supplies a first power supply signal (a constant output voltage signal) to the controller 40. When receiving the constant output voltage signal, the controller turns off the switching transistor 5a if the battery voltage VB becomes higher than a predetermined charging voltage (for example, about 14 V), and turns on the switching transistor 5a when the voltage VB becomes lower than the charging voltage. Therefore, the output voltage of the alternator 3 is controlled at the charging voltage by ON/OFF operation of the field current of the rotor coil 33 in the normal operation (i.e., when the changeover switch 25 is set at the first position where the battery 11 is connected to the alternator 3). Thus, overcharging of the battery does not occur. The battery voltage VB is supplied to the controller 40 to perform this charging operation.

On the other hand, the ECU 30 supplies a second power supply control signal (a high output voltage signal) to the controller 40 when the changeover switch 25 is set at the second position where the EHC 21a is connected to the alternator 3. When receiving the high output voltage signal, the controller 40 holds the switching transistor 5a in the ON state. Therefore, the field current supplied to the rotor coil 33 increases to its maximum value, and the output voltage of the alternator largely increases.

In this embodiment, the ECU 30 holds the changeover switch 25 at the first position and supplies the constant output signal to the controller during the normal operation. Therefore, the output voltage of the alternator 3 is controlled at a relatively low voltage (for example, 14 V) during the normal operation.

When it is required to activate the EHC 21a, for example, when the engine has started, the ECU 30 switches the changeover switch 25 to the second position to connect the EHC 21a to the alternator 3 and supply the high output voltage signal to the controller 40. This causes the controller 40 to increase the output voltage of the alternator 3 and, thereby, a large electric power is supplied to the EHC 21. In this embodiment, the output voltage of the alternator 3 when the EHC 21a is connected to the alternator (during the high output voltage operation) is set at about 25 V.

As explained above, the charging of the battery 11 and the activation of the EHC 21a are controlled by switching the changeover switch 25 between the first and the second positions. However, if the switching of the changeover switch is performed when a large electric current flows through the switch 25, the contacts of the switch may weld. Therefore, in this embodiment, the ECU 30 supplies a third power supply control signal (termination signal) to terminate the power generation of the alternator 3 before switching the changeover switch 25, and switches the changeover switch 25 after the electric current flowing through the switch 25 becomes low. The ECU 30 terminates the power generation of the alternator when it switches the changeover switch 25 from the first to the second position as well as from the second to the first position.

Figure 3:
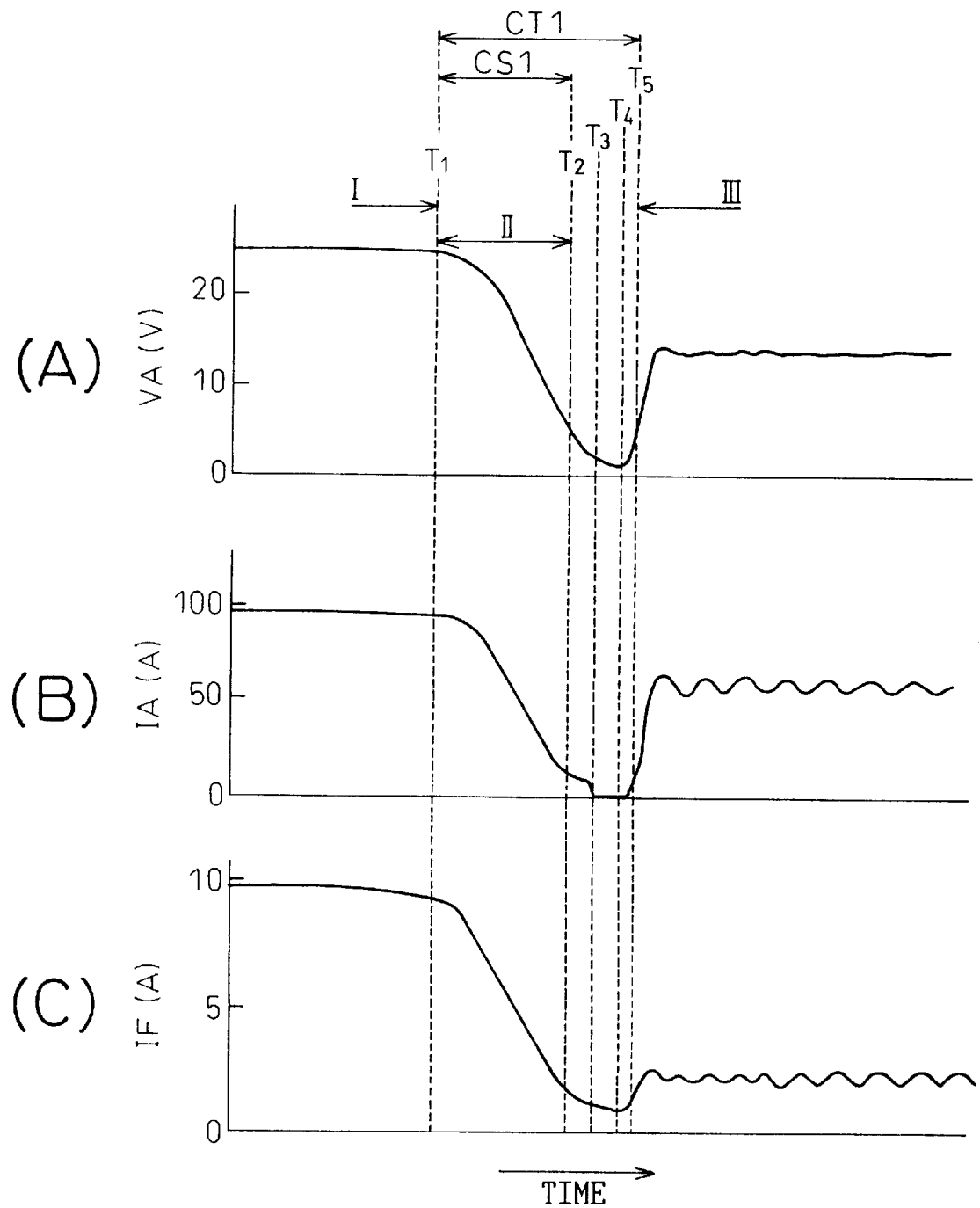
FIG. 3 is a timing diagram showing the switching operation of the changeover switch.

FIG. 3 is a timing diagram which illustrates the changes in the output voltage VA of the alternator 3 (the curve (A)), output current IA of the alternator 3 (the curve (B)) and the field current IF flows through the rotor coil 33 (the curve (C)) during the switching operation of the changeover switch 25 from the second position to the first position according to the present embodiment.

In FIG. 3, in the period I, the changeover switch 25 is in the second position where the EHC 21a is connected to the alternator 3 before it is switched, and the high output voltage operation of the alternator 3 is performed. As explained before, the output voltage VA of the alternator 3 (the curve (A)) in this condition is about 25 V, and the output current IA (the curve (B)) and the field current IF (the curve (C)) are about 100A and 10A, respectively. In this condition, the ECU 30 transmits the termination signal to the controller to turn off the switching transistor 5a (point T1 in FIG. 3).

When the switching transistor 5a is turned off, the field current IF does not stop immediately, and it decreases gradually at a rate determined by a time constants of the stator coils 32 and the rotor coil 33 of the alternator 3. Consequently, the output voltage VA and the output current IA also decrease gradually (the period II in FIG. 3). The ECU 30 transmits a changeover signal to the changeover switch 25 when the current IA decreases to a sufficiently low value which does not cause an arc between the contacts during the switching operation (the point T2 in FIG. 3). When the changeover switch 25 receives the changeover signal, it starts the switching operation after a delay time specific to the switch has lapsed. In the switching operation, the EHC 21a is first disconnected (the point T3) and, then, the battery 11 is connected to the alternator 3 (the point T4). When the switching operation has completed, the ECU 30 transmits the constant output voltage signal to the controller 40 to resume the power generation (the point T5). Thus, when the switching operation of the changeover switch 25 to the first position has completed, the field current IF (the curve (C))is adjusted in such a manner that the output voltage VA of the alternator 3 is maintained at the battery charging voltage (about 14 V) in order to charge the battery 11 (the period III in FIG. 3).

As explained above, switching operation of the changeover switch 25 is performed when the output current of the alternator 3 becomes sufficiently low (i.e., becomes lower than an electric current which causes an arc between the contacts) in this embodiment. In this case, the output current may be actually measured by disposing an electric current sensor at the output terminal 3a of the alternator in order to determine the time for transmitting the changeover signal from the ECU 30. However, as explained before, the field current IF and the output current IA gradually decreases at a rate determined by the time constants of the stator coils and the rotor coil. Therefore, if the field current IF when the power generation is terminated is the same, the time required for the output current IA to decreases to a predetermined value is also the same. In this embodiment, the ECU 30 determines that the output current IA becomes sufficiently low when a predetermined time has elapsed after the power generation was terminated, in order to start the switching operation.

However, since the rate of the decrease in the output current is always the same, the time required for output current IA to decrease to a predetermined value varies according to the value of the output current when the power generation was terminated. Namely, if the changeover switch 25 is in the second position before it is switched, the output voltage VA and the output current IA is high due to the high output voltage operation of the alternator and, thereby, the time required for the output current IA to decrease to a sufficiently low value becomes longer. Therefore, the predetermined time at which the ECU 30 determines that the output current IA becomes sufficiently low is set long enough to ensure that the output current IA decreases to a sufficiently low value even the changeover switch 25 is switched from the second position to the first position.

Figure 4:
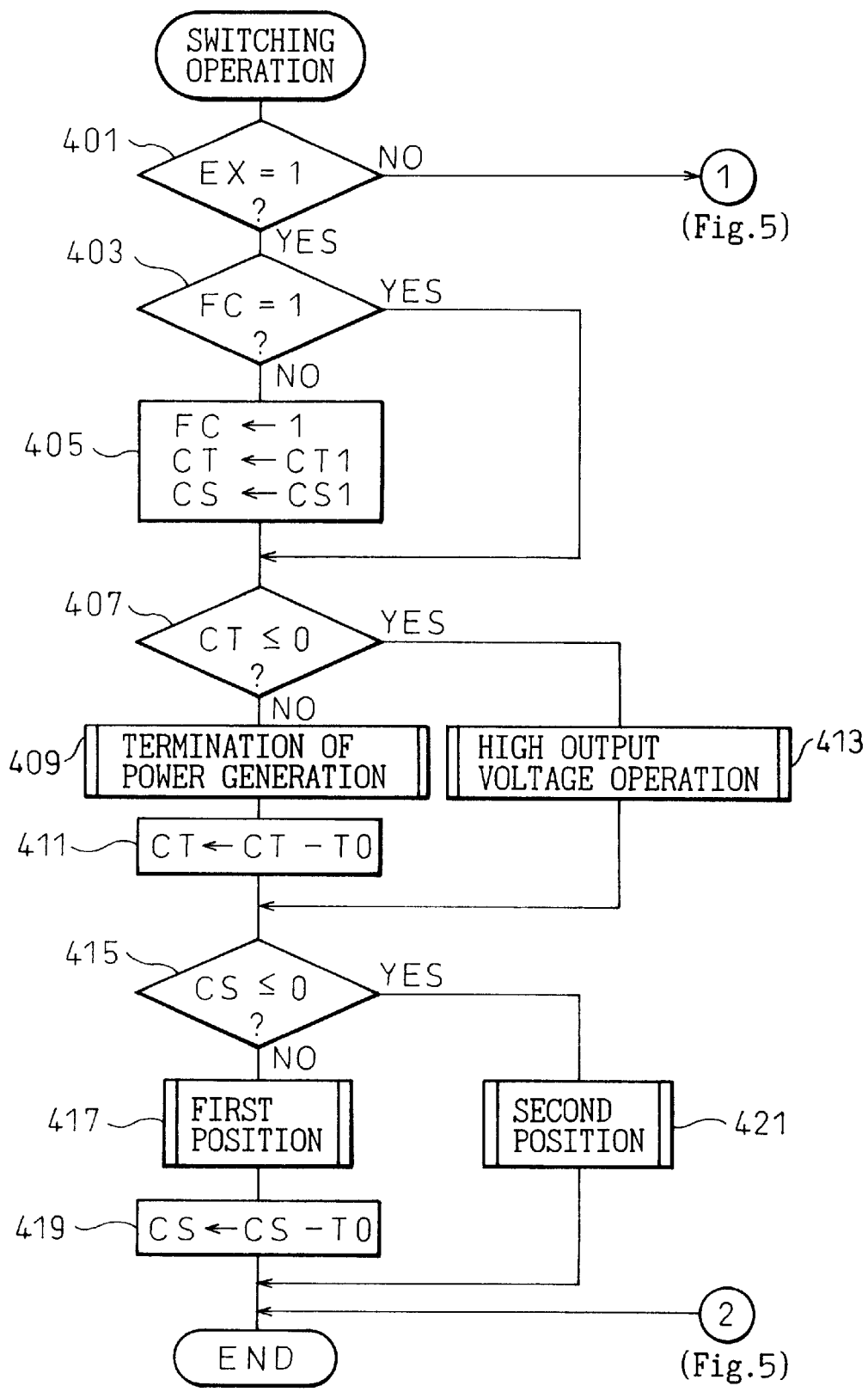
FIGS. 4 and 5 are a flowchart explaining an embodiment of the switching operation of the changeover switch.
Figure 5:
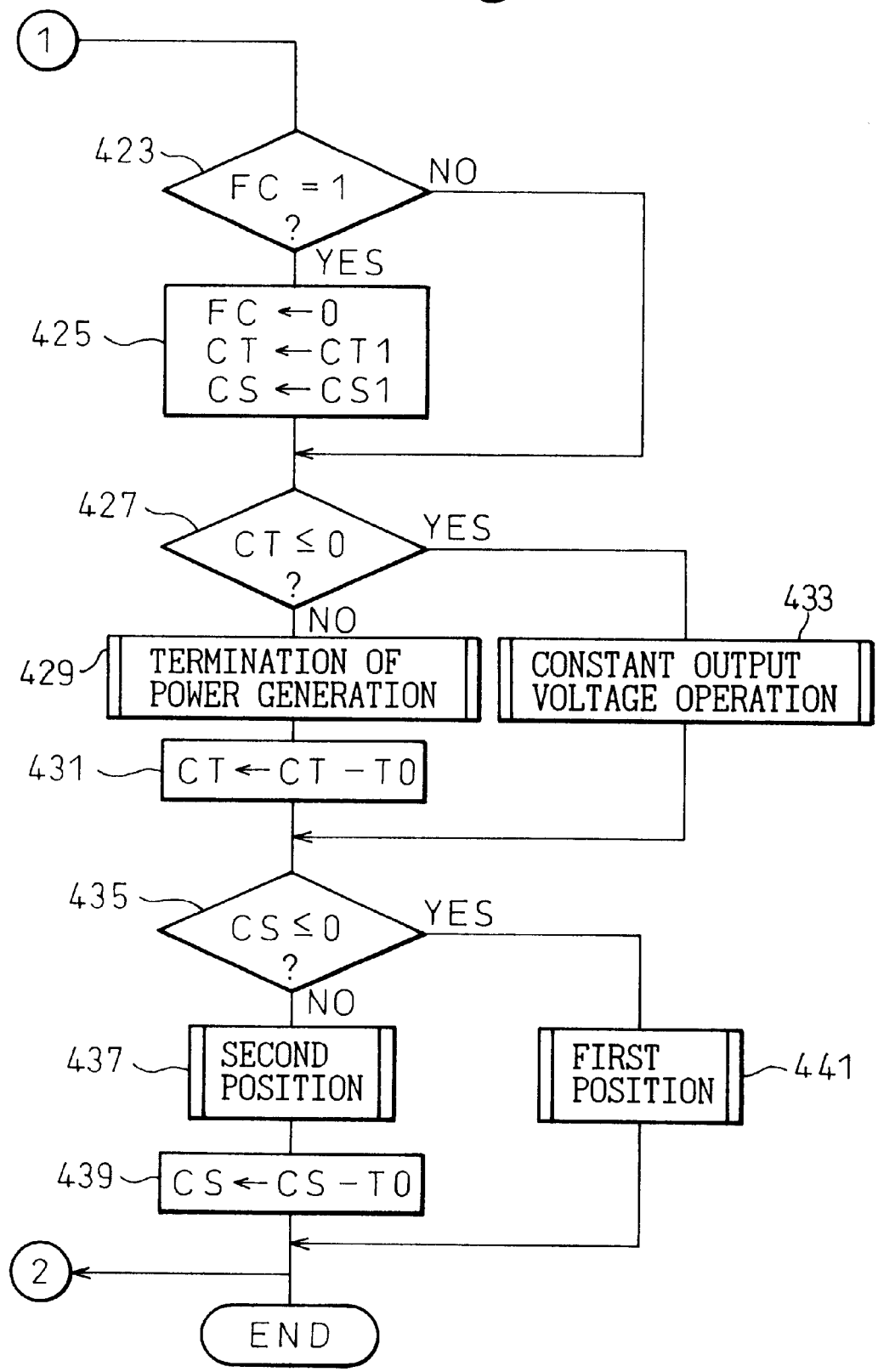

FIGS. 4 and 5 are a flowchart explaining the switching operation of the changeover 25 in FIG. 3. This operation is performed by the ECU 30 by a routine executed at predetermined intervals (for example, every 10 ms).

In this routine, when the switching of the changeover switch 25 from the first position to the second position, as well as from the second position to the first position, is required, the routine first terminates the power generation of the alternator 3 and, then, the routine switches the changeover switch 25 when a predetermined time CS1 has lapsed after the power generation was terminated. The time CS1 is set sufficiently long to ensure that the output current IA decreases to a sufficiently low value and, in this embodiment, set at about 250 ms. The routine restarts the power generation (the high output voltage operation or the constant voltage operation in accordance with the position of the switch 25, as explained before) when a predetermined time CT1 has lapsed after the power generation was terminated. The period CT1 is set at a time longer than a total of the time CS1 and the time required for completing the switching operation (refer to the periods CT1 and CS1 in FIG. 3) and, in this embodiment, set at about 500 ms.

In the flowchart of FIGS. 4 and 5, steps 403 through 421 (FIG. 4) represent the switching operation of the changeover switch 25 from the first position (the battery 11 side) to the second position (the EHC 21a side), and steps 423 through 441 (FIG. 5) represent the switching operation from the second position (the EHC 21a side) to the first position (the battery 11 side).

In FIG. 4, at step 401, the routine determines whether the value of a flag EX is set at 1. The value of the flag EX is set at 1 when it is required to activate the EHC 21a (for example, when the engine started), and is set to 0 when the deactivation of the EHC 21a is required (for example, when a predetermined time has lapsed after the engine started) by another routine executed by the ECU 30 (not shown). If EX=1 at step 401, i.e., if the EHC 21a is to be activated, the routine proceeds to determine whether the value of a flag FC is set at 1. The value of the flag FC represents whether electric power is supplied to the EHC 21a, and FC=1 means that electric power is supplied to the EHC 21a. The value of the flag FC is set to 1 at step 405, and set to 0 at step 425 (FIG. 5).

When FC≠1 at step 403, this means that electric power is not supplied to the EHC 21a though the activation of the EHC 21a is required. Therefore, in this condition, the changeover switch 25 is set at the first position (the battery 11 side) and it is necessary to switch the changeover switch 25 from the first position to the second position (the EHC 21a side). In this case, the routine performs step 405 to set the value of the flag FC to 1 and sets the values of counters CT and CS to predetermined values CT1 and CS1, respectively. As explained before, the values of CT1 and CS1 in this embodiment are set at 500 (ms) and 250 (ms), respectively.

Since the value of the flag FC is set to 1 at step 405, the routine proceeds from step 403 to step 407 when the routine next executed, i.e., step 405 is skipped.

The routine, then, executes steps 407 through 411 to supply the termination signal for terminating the power generation to the controller 40 for a period CT1. Namely, the routine decreases the value of the counter CT by a predetermined constant value T0 at step 411, and generates the termination signal (step 409) until the value of the counter CT decreases to 0 (step 415). During the period in which the termination signal is supplied, the controller 40 holds the switching transistor 5a in the OFF state to terminate the power generation of the alternator 3.

When the value of the counter CT decreases to 0 (step 407), the routine generates a high output voltage signal to the controller 40 (step 413). When the controller 40 receives the high output voltage signal, the controller 40 holds the switching transistor 5a in the ON state to perform the high output voltage operation of the alternator 3. The decrement T0 in step 411 is set at the value the same as the interval of the execution of the routine and, in this embodiment, is set at 10 (ms). By performing steps 407 through 413, the power generation of the alternator 3 is terminated for the time period CT1 (500 ms), and the high output voltage operation of the alternator 3 starts when the period CT1 has lapsed.

Steps 415 through 421 are for switching the changeover switch 25. At steps 415 through 421, the value of the counter CS is decreased by T0 at step 419, and the changeover switch 25 is held at the first position (the battery 11 side) until the value of the counter CS decreases to 0 (steps 415 and 417). Namely, the actual switching of the changeover switch 25 is not performed until the predetermined time CS1 has lapsed since the power generation was terminated (step 415), i.e., the actual switching is not performed until the output current IA decreases to a sufficiently low value. When the time CS1 has lapsed, the changeover switch 25 is switched from the first position to the second position.

Steps 423 through 441 in FIG. 5 represent the switching operation of the changeover switch 25 from the first position (the battery 11 side) to the second position (the EHC 21$a$ side). These steps are similar to steps 403 through 421 explained above.

Namely, if EX≠1 at step 401, i.e., if the deactivation of the EHC 21$a$ is required, the routine performs step 423 in FIG. 5 to determine whether the value of the flag FC is set at 1. If FC=1 at step 423, this means that the changeover switch 25 is set at the second position to supply electric power to the EHC 21$a$ even though the deactivation of the EHC 21$a$ is required. Therefore, the routine sets the value of the flag FC to 0, and sets the values of the counters CT and CS at the predetermined values CT1 (500 (ms)) and CS1 (250 (ms)), respectively, at step 425. After executing step 425, the routine performs the switching operation of the changeover switch 25 from the second position to the first position at steps 427 through 441.

In this case, the power generation of the alternator 3 is terminated until the period CT1 (500 ms) has lapsed (steps 427 through 433), and restarted when this period has lapsed (step 433). The controller 40 performs the constant output voltage operation of the alternator 3 for charging the battery 11 when the value of the flag FC is set at 1.

At steps 435 through 441, the changeover switch 25 is held at the second position until the time CS1 has lapsed after the power generation was terminated (step 437), and is switched to the first position when the time CS1 has lapsed (step 441).

According to the present embodiment, as explained above, the switching of the changeover switch 25 between the first position and the second position is performed when the predetermined time CS1 (250 ms) has lapsed after the power generation terminated and, then, the power generation restarts when the predetermined time CT1 (500 ms) has lapsed since the termination of the power generation. Therefore, the switching of the changeover switch 25 is always performed in a condition where the electric current flowing through the switch 25 is sufficiently low and, thereby, the failure of the switch 25 such as welding of the contacts does not occur.

Next, another embodiment of the switching operation of the changeover switch 25 is explained. As explained in FIG. 3, the time required for the output current IA (i.e., the electric current flowing through the switch 25) to decrease to a sufficiently low value varies in accordance with the output power of the alternator 3 immediately before the power generation was terminated. Since the electric power consumption of the EHC 21$a$ is almost constant, the time required for the current IA to decrease to a sufficiently low value is also constant during the switching operation from the second position (the EHC 21$a$ side) to the first position (the battery 11 side). However, since the output power of the alternator 3 when the changeover switch 25 is set at the first position (the battery 11 side) varies in accordance with the conditions of the battery 11 and the various electric loads 23 of the vehicle. Therefore the time required for the current IA to decrease to a sufficiently low value, in the switching operation from the first position to the second position, varies accordingly. In the embodiment in FIGS. 4 and 5, the time CS1 in the switching operation from the first position to the second position is set at the value corresponding to the maximum output power of the alternator 3, i.e., a value the same as the time CS1 in the switching operation from the second position to the first position. This means that the time CS1 in the switching operation from the first position to the second position in the previous embodiment is sometimes longer than the time actually required.

Therefore, in this embodiment, the output power of the alternator is adjusted to a predetermined value before the switching operation from the first position to the second position in order to make the required time CS1 becomes constant. Namely, the ECU 30 in this embodiment controls the field current IF at a predetermined constant value before terminating the power generation when the switching operation of the changeover switch 25 from the first position to the second position is required. By controlling the field current IF at a predetermined value, the output power of the alternator 3 also becomes a predetermined constant value. Therefore, when the power generation is terminated, the time required for the output current IA to decrease to a sufficiently low value becomes constant in this embodiment and, thereby, the time for switching the changeover switch 25 from the first position to the second position can be exactly determined.

Figure 6:
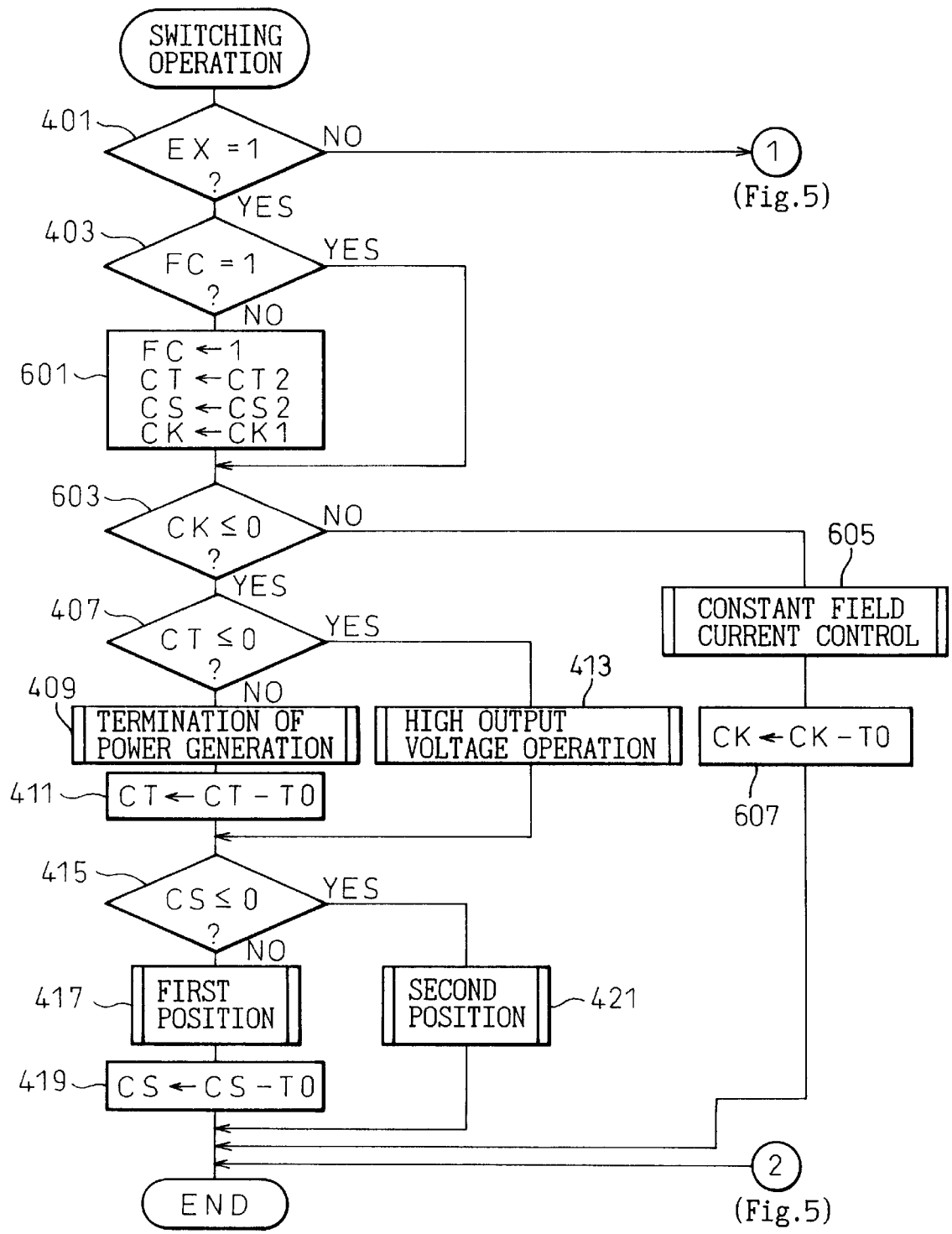
FIG. 6 is a part of a flowchart explaining another embodiment of the switching operation of the changeover switch.

FIG. 6 shows a part of a flowchart of the switching operation according to the present embodiment. In this embodiment, the remaining part of the flowchart is the same as FIG. 5, i.e., FIGS. 6 and 5 form a complete flowchart of the switching operation according to the present embodiment. This operation is also performed by a routine executed by the ECU 30 at predetermined intervals (for example, every 10 ms). In FIG. 6, the steps having same numbers as those in FIG. 4 represent the same operations and, only the steps different from those in FIG. 4 are explained here.

In this embodiment, step 601 is performed in lieu of step 405 in FIG. 4 when the changeover switch 25 is to be switched from the first position (the battery 11 side) to the second position (the EHC 21$a$ side). At step 601, though the value of the flag FC is set to 1, the values of the counters CT and CS are set to a predetermined values CT2 and CS2 which are different from the values CT1 and CS1 in step 405 in FIG. 4. Further, the value of another counter CK (a constant output operation counter) is set to CK1 at step 601. The value of CK1 is set at a constant around 100 (ms), and the values of CT2 and CS2 are set at around 300 (ms) and 150 (ms) in this embodiment. Namely, the values of CT2 and CS2 are smaller than CT1 and CS1 in FIGS. 4 and 5. Further, in FIG. 6 steps 603 through 607 are added to the flowchart in FIG. 4. Namely, in this embodiment, steps 605 and 607 are performed in the switching operation of the changeover switch 25 from the first position to the second position before the power generation is terminated at step 409.

In the switching operation from the first position to the second position in this embodiment, the ECU 30 first controls the field current IF of the alternator 3 at a predetermined constant value (step 605) until the time CK (100 ms) has lapsed (steps 603 and 607). The field current IF is controlled at a constant value by setting a duty ratio (the ratio of the length of an ON period to the length of one ON-OFF cycle period) of the switching transistor 5a at a predetermined value (for example, 50%). When the predetermined time CK1 has lapsed, i.e. when it can be considered that the output of the alternator 3 becomes constant, the power generation of the alternator 3 is terminated (step 409). Then, when the time CS2 (150 ms) has lapsed after the power generation was terminated, the changeover switch 25 is switched from the first position to the second position (steps 415 and 421). The power generation is restarted when the predetermined time CT2 (300 ms) has lapsed (steps 407 and 413).

The period CT2 for terminating the power generation and the time CS2 for starting the switching are set at the values corresponding to the constant output of the alternator (which is lower than the maximum output). Therefore, the values CT2 and CS2 are set at values smaller than CT1 and CS1 in FIGS. 4 and 5.

The switching operation of the changeover switch 25 from the second position (the EHC 21a side) to the first position (the battery 11 side) in this embodiment is exactly the same as that of the embodiment in FIGS. 4 and 5.

According to the present embodiment, since the output of the alternator 3 is controlled at a predetermined constant value before the changeover switch 25 is switched from the first position to the second position, the output current IA of the alternator 3 can be exactly controlled and, thereby, the failure of the switch such as welding of the contacts can be prevented reliably.

Next, another embodiment of the switching operation of the changeover switch 25 is explained with reference to FIG. 7. In the embodiment in FIG. 6, the period CT2 for terminating the power generation and the time CS2 for starting the switching is set at constant values by controlling the output of the alternator at a predetermined constant value before switching the changeover switch 25 in order to control the output current IA of the alternator during the switching operation precisely. However, the output current IA during the switching operation also can be controlled precisely by changing the period for terminating the power generation and the time for starting the switching in accordance with the output power of the alternator immediately before the power generation is terminated. Therefore, in this embodiment, the period for terminating the power generation and the time for starting the switching is set in accordance with the field current IF (i.e., the output power of the alternator 3) immediately before the power generation is terminated.

Figure 7:
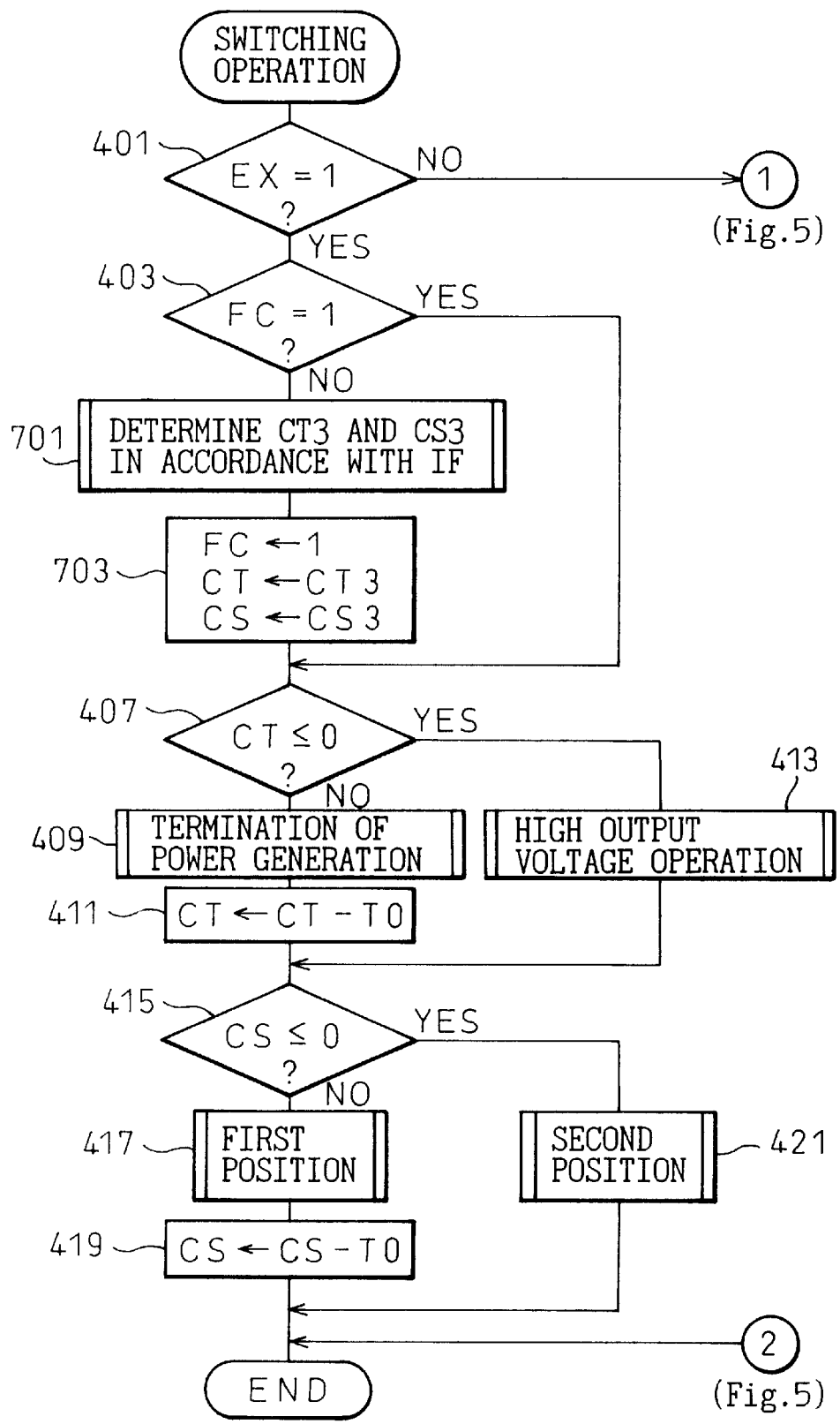
FIG. 7 is a part of a flowchart explaining another embodiment of the switching operation of the changeover switch.

FIG. 7 shows a part of a flowchart of the switching operation according to the present embodiment. In this embodiment, the remaining part of the flowchart is the same as FIG. 5, i.e., FIGS. 7 and 5 form a complete flowchart of the switching operation according to the present embodiment. This operation is also performed by a routine executed by the ECU 30 at predetermined intervals (for example, every 10 ms). In FIG. 7, the steps having same numbers as those in FIG. 4 represent the same operations and only the steps different from those in FIG. 4 are explained here.

The flowchart in FIG. 7 is different from the flowchart in FIG. 4 in that steps 701 and 703 are performed in FIG. 6 instead of step 405 in FIG. 4. At step 701, the period CT3 for terminating the power generation and the time CS3 for starting the switching are determined in accordance with the field current IF of the alternator 3. At step 703, then, the value of the flag FC is set to 1 and the values of the counters CT and CS are set to CT3 and CS3, respectively, determined at step 701. Therefore, the period for terminating the power generation and the time for starting the switching at steps 407 through 421 are set in accordance with the field current IF immediately before the power generation was terminated and, thereby the output current IA in the switching operation can be controlled precisely. The field current IF may be directly measured by inserting a shunt resistance in the field current circuit as explained later in FIG. 12, or may be calculated from the duty ratio of the switching transistor 5a in the regulator 5. The values of CT3 and CS3 are set at a larger value as the value of IF immediately before the power generation is terminated becomes larger. In this embodiment, the relationships of CT3, CS3 and IF are determined by experiment using the actual alternator in which the time required for the output current IA to decrease to a sufficiently low value are measured while changing the field current IF. In this embodiment, the switching operation of the changeover switch 25 from the second position (the EHC 21a side) to the first position (the battery 11 side) is the exactly the same as that in the embodiment in FIGS. 4 and 5.

Next, another embodiment of the present invention is explained. In the previous embodiment, since the output current IA becomes lower as the time lapsed after the power generation becomes longer, the safety of the switching operation increases as the time for starting the switching operation (CS1, CS2 and CS3 in the previous embodiments) are set longer. However, another problem occurs in some cases if the time for starting the switching operation is set longer.

Figure 8:
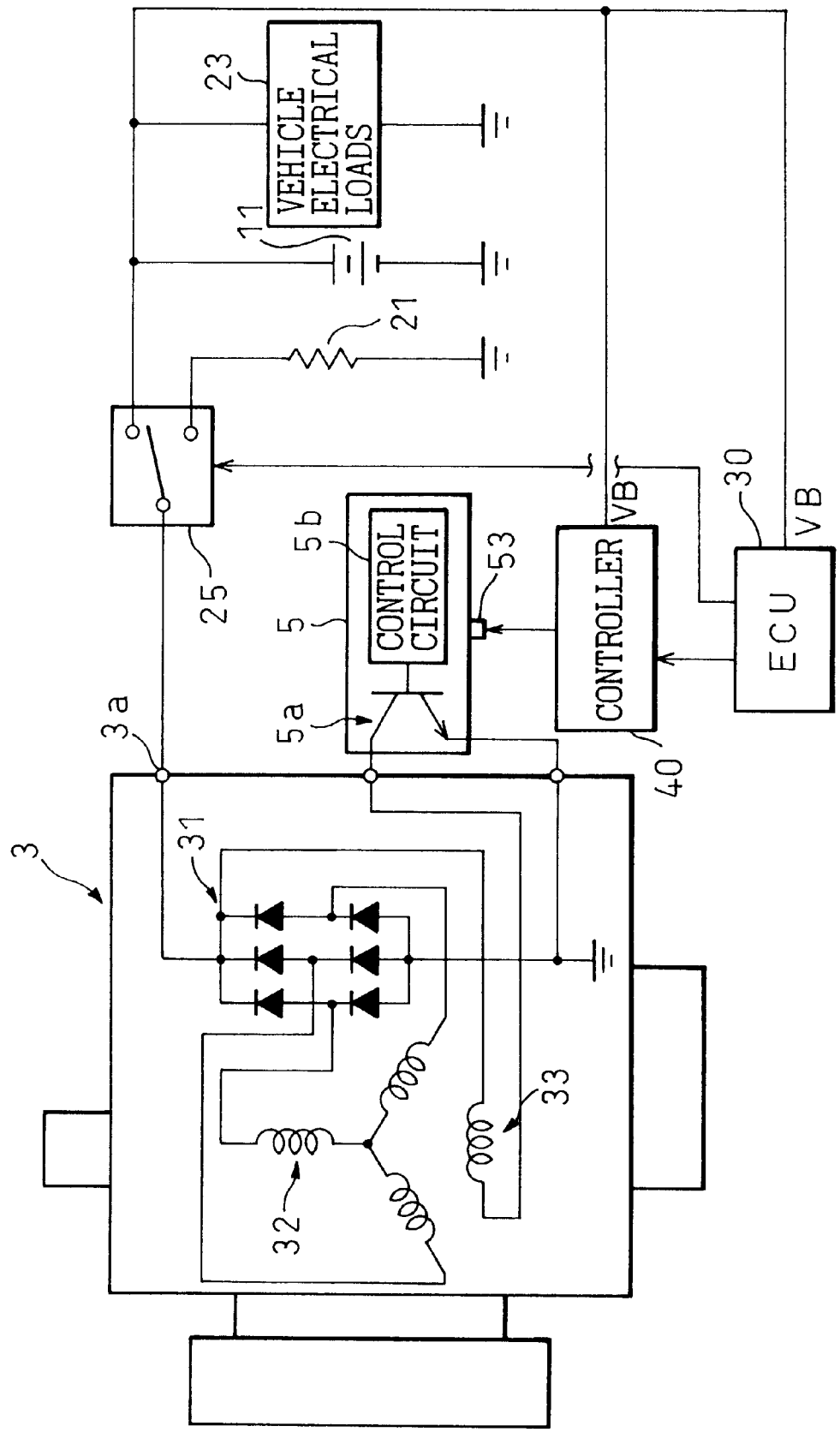
FIG. 8 is a circuit diagram of another embodiment of the power supply system used in FIG. 1.

FIG. 8 is a circuit diagram of the power supply system. The power supply system in FIG. 8 is different from FIG. 2 in that the rotor coil 33 is connected to the output terminal of the rectifier 33 instead of the battery 11. Namely, the field current IF of the rotor coil 33 is supplied from the alternator itself in this embodiment. When the power supply system is constructed as shown in FIG. 8, a problem may occur if the time for starting the switching is set longer. If the time for starting the switching is set longer, the time for terminating the power generation must be set longer accordingly. When the power generation of the alternator 3 is terminated, the output voltage VA of the alternator decreases. If the period for terminating the power generation is prolonged, the output voltage VA decreases largely. In this case, since the field current of the rotor coil in the circuit in FIG. 8 is supplied from the alternator itself, the field current supplied to the rotor coil becomes insufficient to generate power even if the switching transistor 5a is turned on, and it becomes impossible to restart the power generation after completing the switching of the changeover switch 25. This problem is peculiar to the switching operation from the first position (the battery 11 side) to the second position (the EHC 21a side) and does not occur in the switching operation from the second position to the first position. Since the output terminal of the alternator 3 is connected to the buttery 11 when the switching from the second position to the first position has completed, the field current can be supplied from the battery 11 even if the alternator does not generate power.

In order to prevent this problem from occurring, the period for terminating the power generation in the switching operation from the first position (the battery 11 side) to the second position (the EHC 21a side) is set shorter than the period for terminating the power generation in the switching operation from the second position (the EHC 21a side) to the first position (the battery 11 side) so that the power generation can be restarted before the field current decreases excessively.

Figure 9:
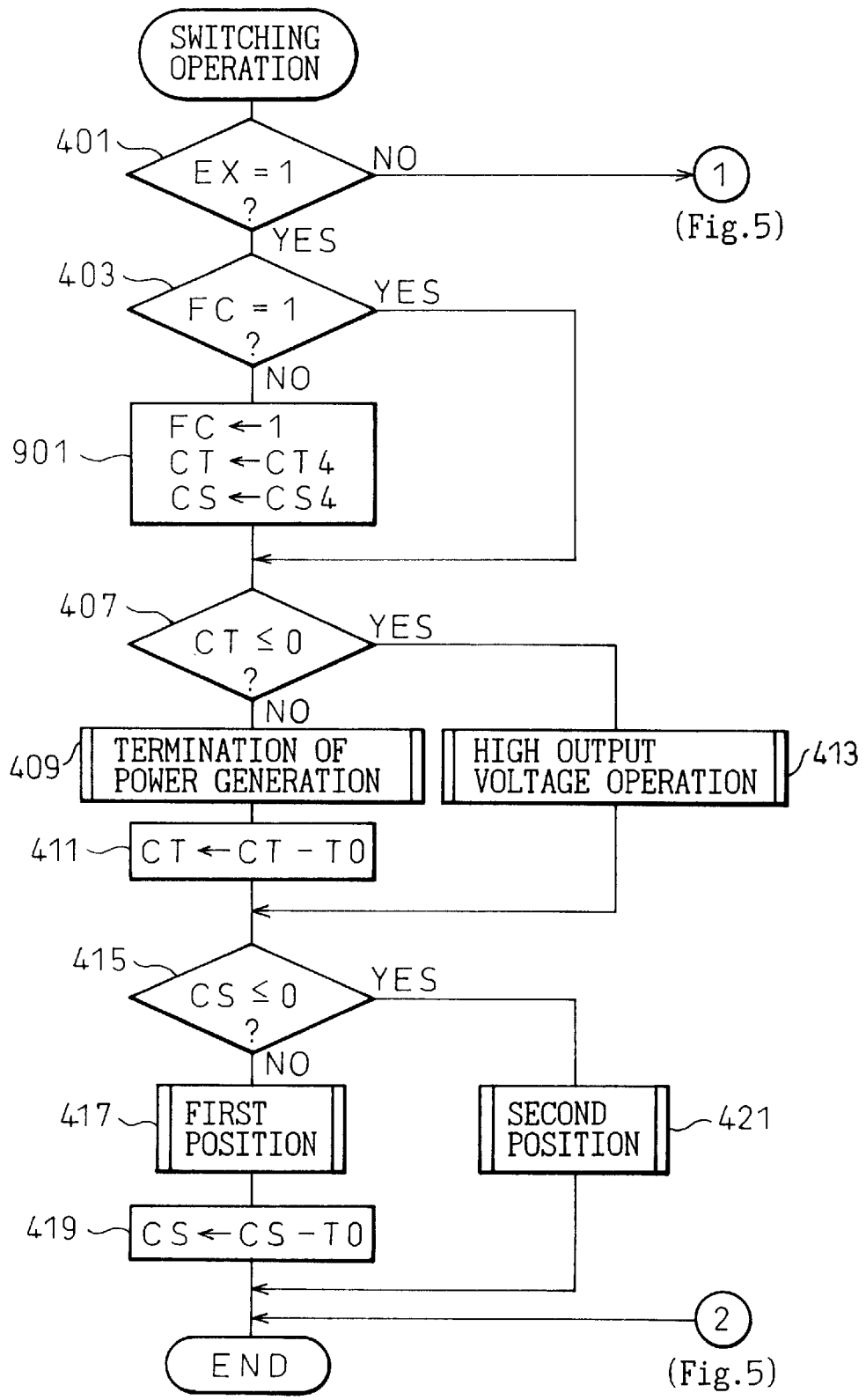
FIG. 9 is a part of a flowchart explaining another embodiment of the switching operation of the changeover switch.

FIG. 9 shows a part of a flowchart of the switching operation according to the present embodiment. In this embodiment, the remaining part of the flowchart is also the same as FIG. 5 and FIGS. 8 and 5 form a complete flowchart of the switching operation of the present embodiment. This operation is also performed by a routine executed by the ECU 30 at predetermined intervals (for example, every 10 ms). In FIG. 8, the steps having same numbers as those in FIG. 4 represent the same operations and, only the steps different from those in FIG. 4 are explained here.

The flowchart in FIG. 8 is different from the flowchart in FIG. 4 in that step 901 is performed in FIG. 9 instead of step 405 in FIG. 4. At step 901, the value of the flag FC is set to 1, and the values of the counters CT and CS are set to predetermined values CT4 and CS4 which are different from CT1 and CS1 in FIG. 4, respectively. In this embodiment, the period CT4 for terminating the power generation is set at about 300 ms, and the time for starting the switching CS4 is set at about 150 ms. Namely, the period for terminating the power generation in this embodiment is very short compared with the same in the embodiment in FIGS. 4 and 5. Therefore, according to this embodiment, the power generation after the switching from the first position to the second position can be restarted without fail. As explained before, the power generation can be restarted after the switching from the second position to the second position even though the time for terminating the power generation is prolonged. Therefore, the operation exactly the same as that in FIGS. 4 and 5 is performed also in this embodiment when the changeover switch 25 is switched from the second position to the first position.

Next, another embodiment of the present invention is explained. Although the time to safely switch the changeover switch 25 is determined based on the time lapsed from the termination of the power generation in the previous embodiments, the time to switch the changeover switch 25 can be determined more precisely by detecting an actual electromotive force of the alternator (i.e., the electromotive force of the stator coils 32). Especially, when the changeover switch 25 is switched from the first position (the battery 11 side) to the second position (the EHC 21a side), the safety of the switching operation can be secured by determining the time for switching the changeover switch 25 based on the electromotive force.

The stator coils 32 are connected to the output terminal 3a via the diode rectifier 31 as shown in FIGS. 2 and 8. Therefore, when the battery 11 is connected to the output terminal 3a, i.e., when the changeover switch 25 is set at the first position, no electric current flows between the output terminal 3a and the battery 11 if the electromotive force of the stator coils 32 (the input voltage of the rectifier 31) becomes lower than the battery voltage.

Figure 10:
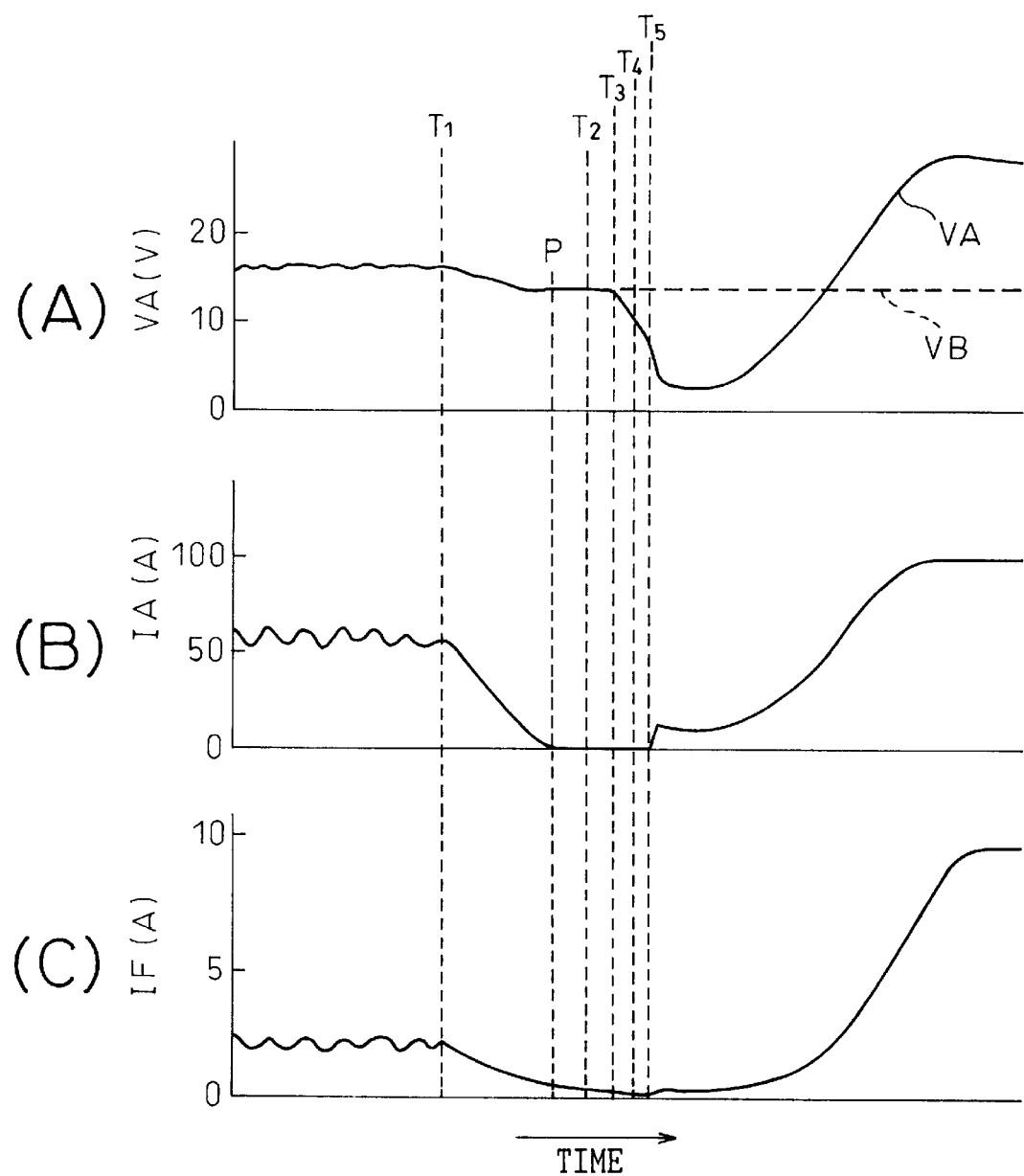
FIG. 10 is another timing diagram showing the switching operation of the changeover switch.

FIG. 10 is a timing diagram illustrating the changes in the output voltage VA of the alternator 3 (the curve (A)), output current IA of the alternator 3 (the curve (B)) and the field current IF flows through the rotor coil 33 (the curve (C)) during the switching operation of the changeover switch from the first position (the battery 11 side) to the second position (the EHC 21a side) in the power supply circuit in FIGS. 2 and 8. In FIG. 10, the point T1 indicates the time when the power generation is terminated, T2 indicates the time when the changeover signal is generated by ECU 30 and T3 indicates the time when the battery 11 is disconnected from the alternator by the switch 25. The point T4 indicates the time when the EHC 21a is connected to the alternator 3 by the switch 25 and T5 indicates the time when the power generation is restarted. The points T2, T3 and T4 in FIG. 10 shows the case where these times are determined in accordance with the time lapsed after the power generation was terminated (i.e., same as the times in the embodiments in FIGS. 4 and 5). The battery voltage VB is shown by the broken line in the curve (A) in FIG. 10. As seen from the curves (A) and (B) in FIG. 10, the output current IA becomes 0 when the output voltage VA decreases and becomes the same as the battery voltage VB (the point P in FIG. 10) after the power generation was terminated (the point Ti). Namely, no electric current can flow through the rectifier 31 after the point P since the electromotive force of the stator coils 32 becomes lower than the battery voltage VB. Therefore, if the changeover switch 25 is switched at the point P in FIG. 10, since no electric current flows through the switch 25, the safety of the switch 25 can be secured.

In the embodiments explained hereinafter, the actual electromotive force VS of the stator coils 32 is detected, and the changeover switch 25 is switched from the first position (the battery 11 side) to the second position (the EHC 21a side) when the electromotive force VS becomes lower than the battery voltage VB.

FIGS. 11 through 14 show the circuit diagrams of the power supply system in which the electromotive force VS of the stator coils 32 is detected. In FIGS. 11 through 14, the reference numerals same as those in FIGS. 2 and 8 indicate the similar elements.

Figure 11:
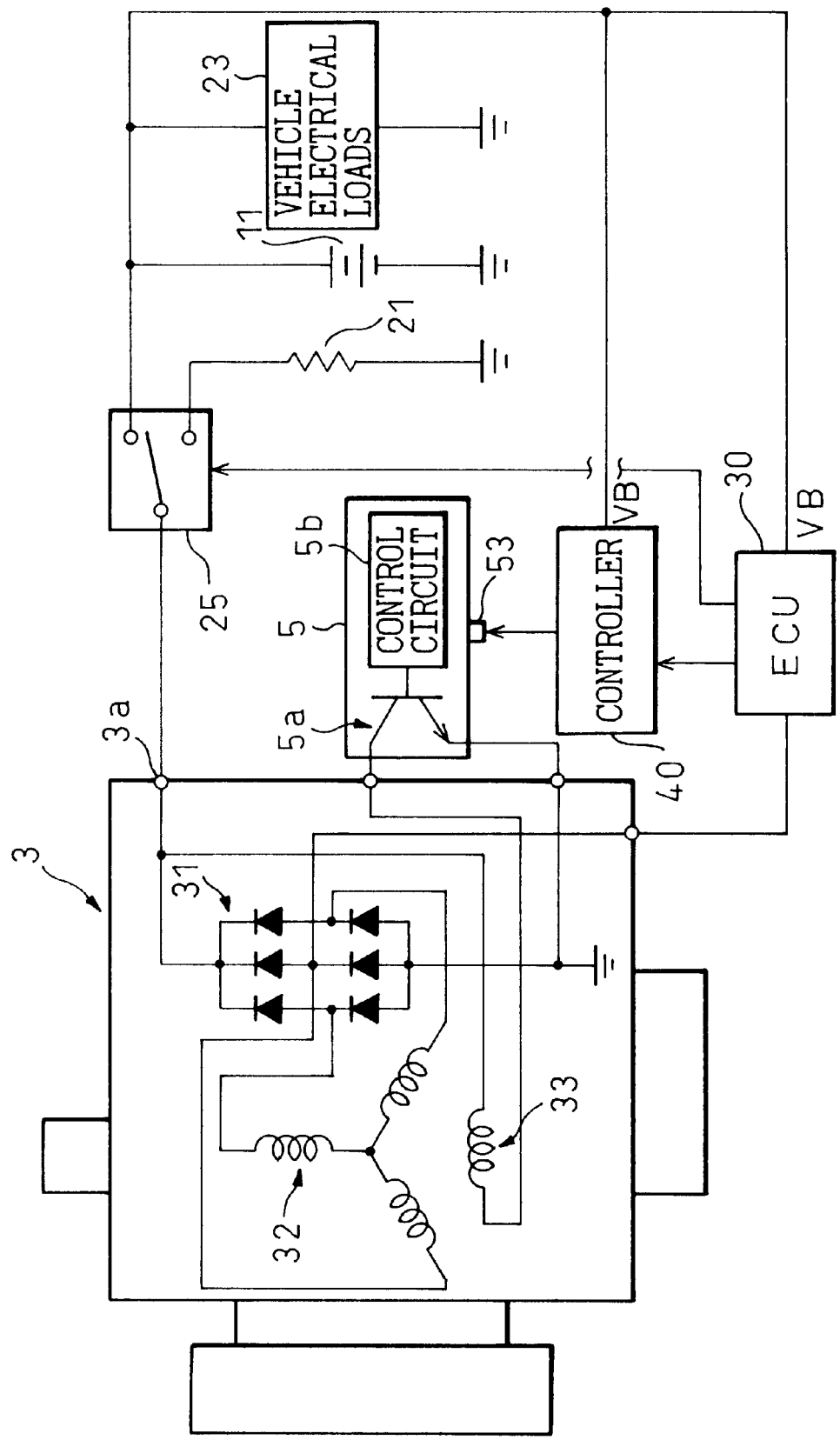
FIG. 11 is a circuit diagram of another embodiment of the power supply system used in FIG. 1.

In FIG. 11, the electromotive force VS of the stator coils 32 is detected by reading an actual voltage of one of the coils in the stator.

The electromotive force also can be detected indirectly based on the field current IF of the rotor coil 33. Since the electromotive force VS of the stator coils 32 changes in accordance with the field current IF, the changeover switch 25 may be switched from the first position to the second position when the field current IF becomes lower than a predetermined value. In this case, a threshold of the field current where the electromotive force VS of the stator becomes lower than a minimum battery voltage (for example, about 8 V) is previously determined by experiment, and the switching of the changeover switch 25 from the first position to the second position is performed when the field current IF decreases to the threshold value.

Figure 12:
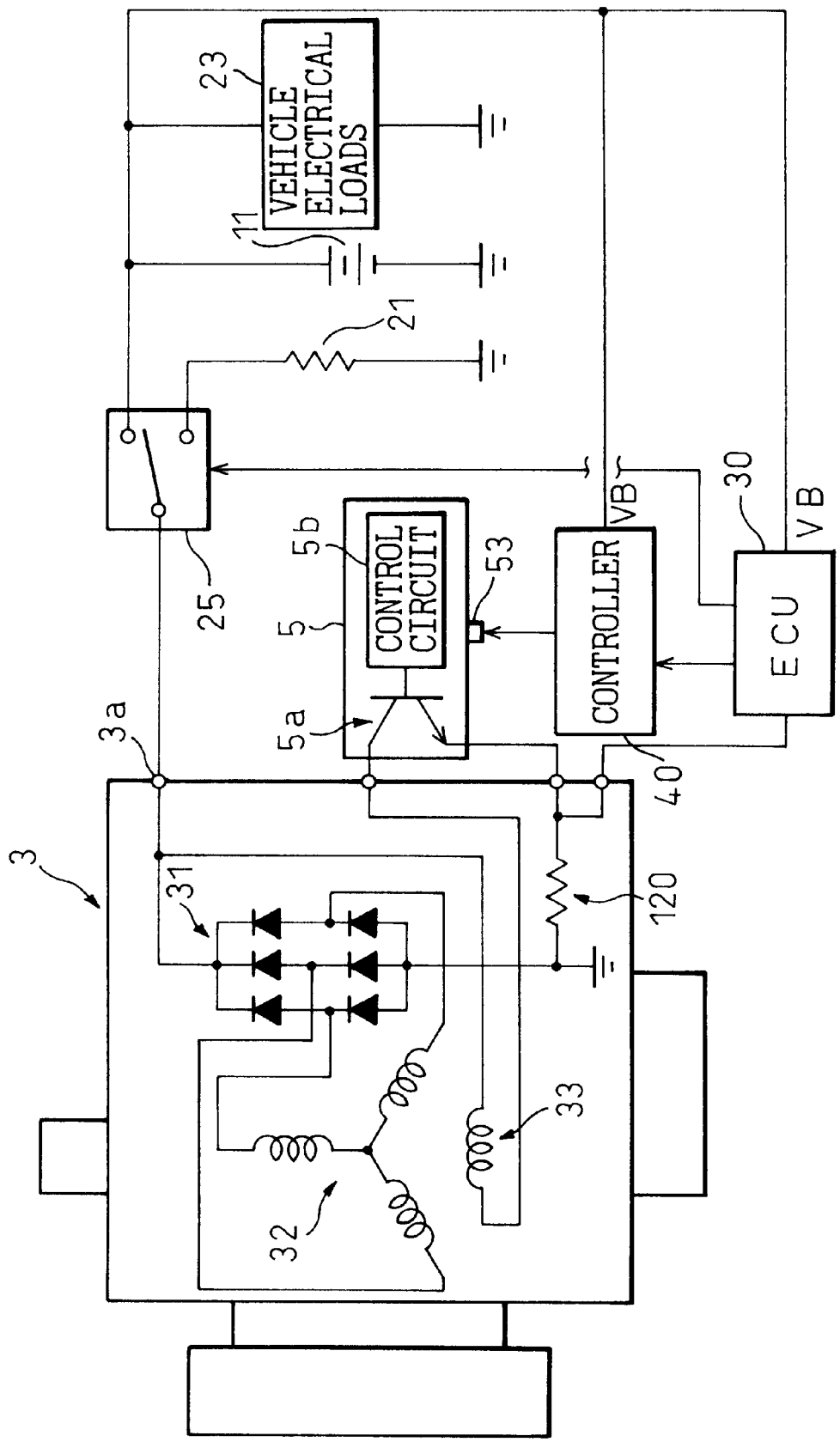
FIG. 12 is a circuit diagram of another embodiment of the power supply system used in FIG. 1.
Figure 13:
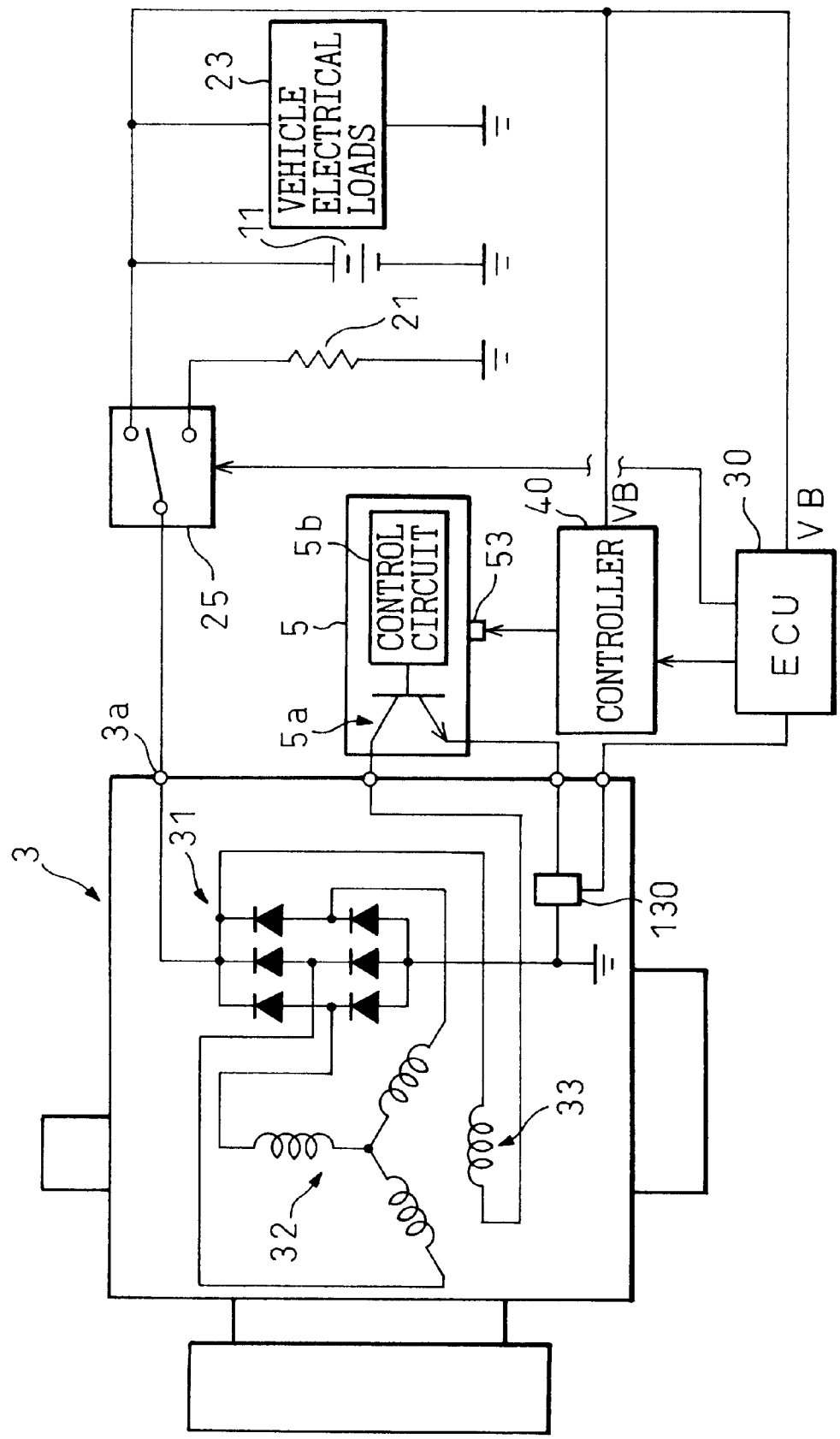
FIG. 13 is a circuit diagram of another embodiment of the power supply system used in FIG. 1.
Figure 14:
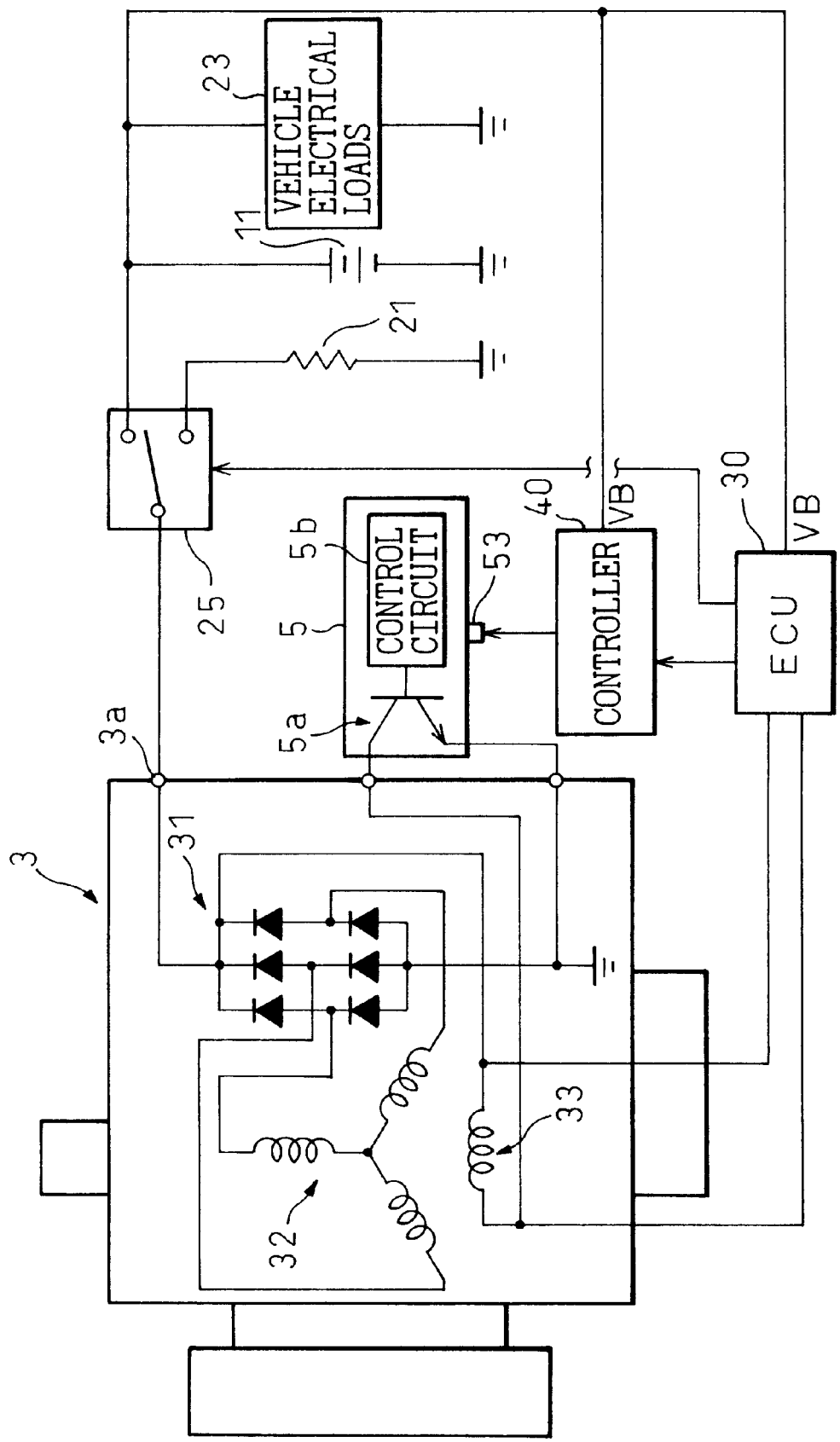
FIG. 14 is a circuit diagram of another embodiment of the power supply system used in FIG. 1.

In FIG. 12, the field current IF is measured by connecting a shunt resistance to the rotor coil 33 in a series arrangement. FIG. 13 shows the case where an electric sensor is used in lieu of the shunt resistance for measuring the field current IF. Further, since the value of the field current IF changes in proportion to the value of the voltage across the rotor coil 33, the field current IF, and also the electromotive force VS, can be indirectly detected by measuring the voltage across the rotor coil 33. FIG. 14 shows the case where the voltage across the rotor coil 33 is detected.

Figure 15:
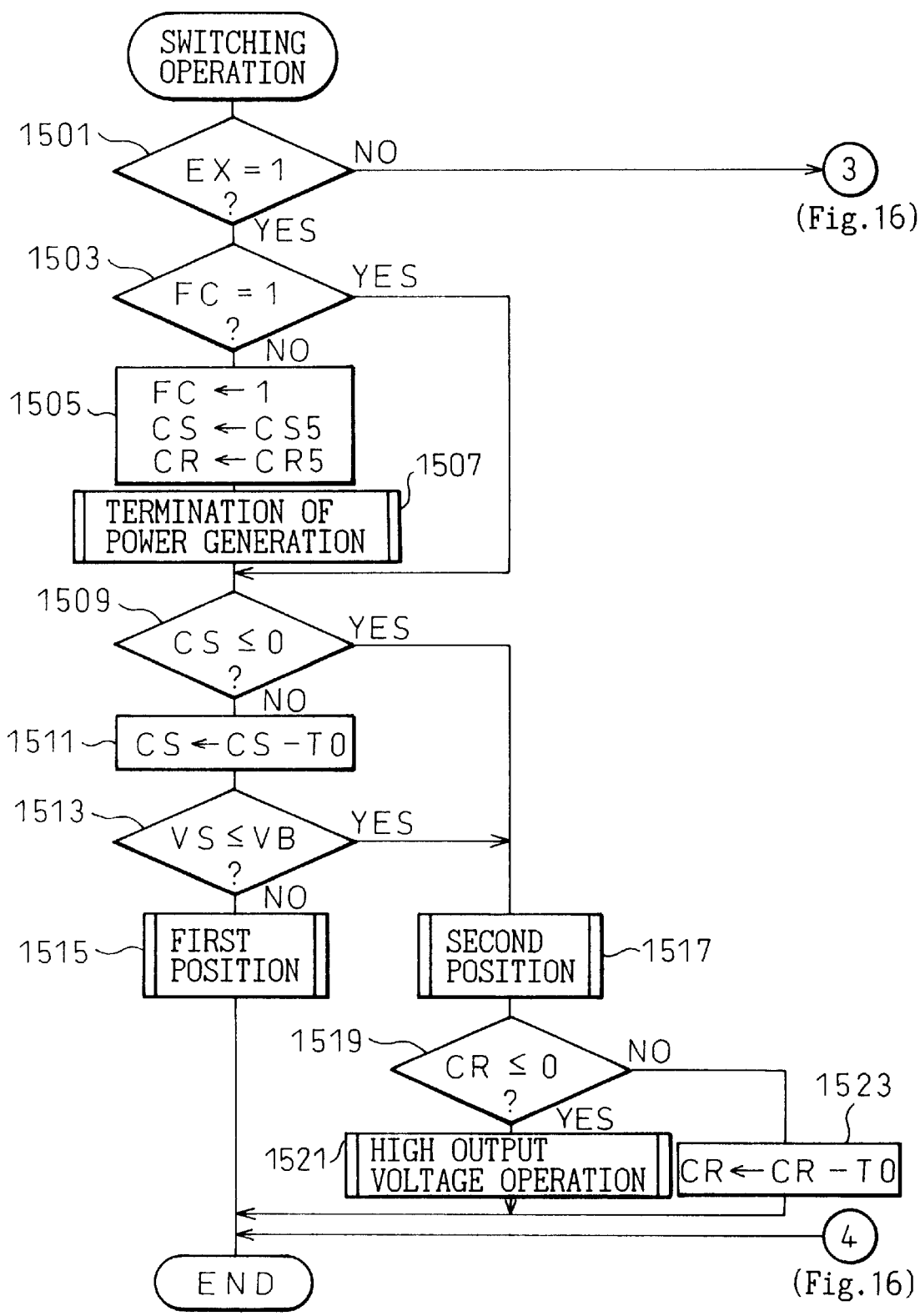
FIGS. 15 and 16 are a flowchart explaining another embodiment of the switching operation of the changeover switch.
Figure 16:
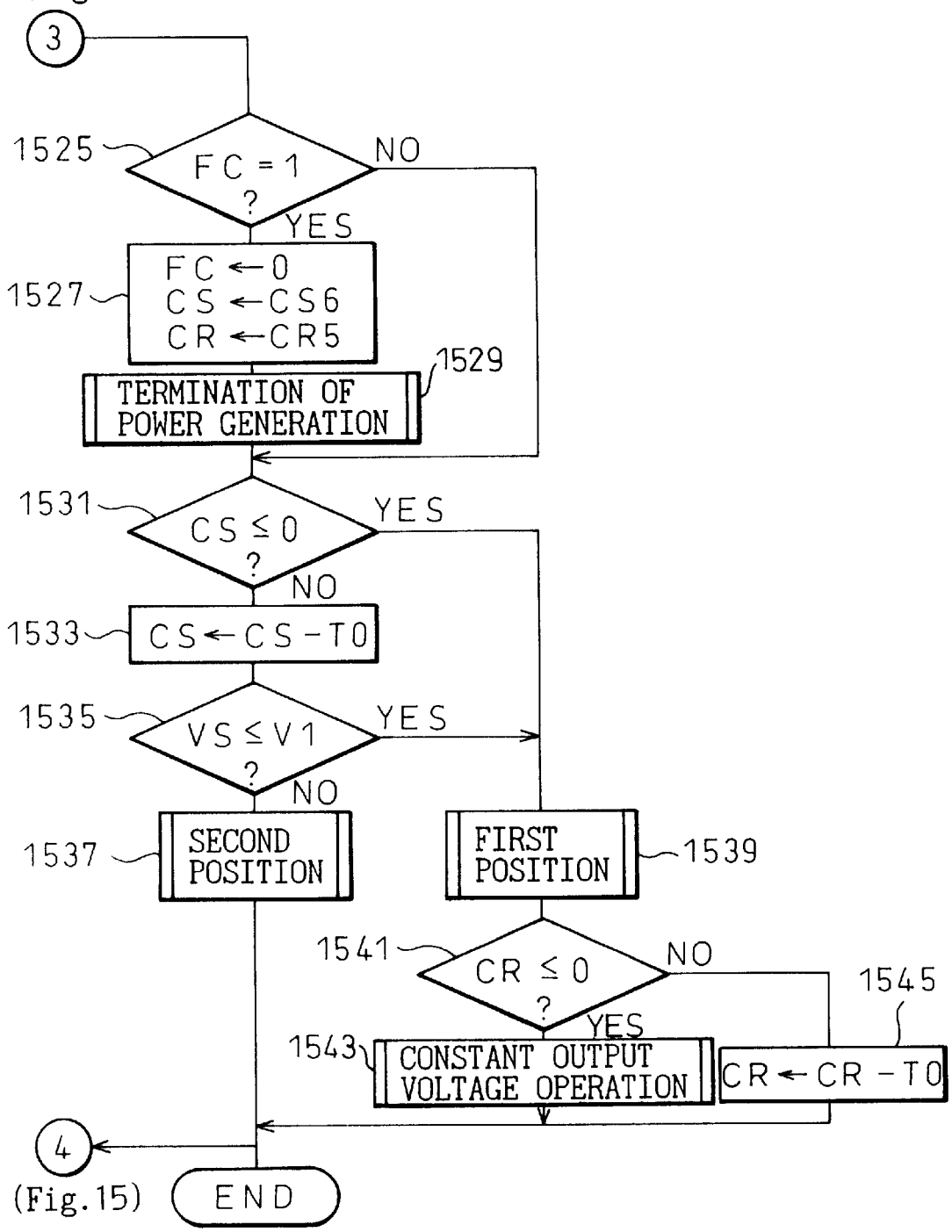

FIGS. 15 and 16 are a flowchart explaining the switching operation of the changeover switch 25 of the present embodiment in which the time for switching the switch 25 is determined based on the electromotive force VS of the stator coils 32. This operation is performed by a routine executed by the ECU 30 at predetermined intervals (for example, every 10 ms).

In this switching operation, both the time lapsed from the termination of the power generation and the electromotive force VS of the stator coils are used for determining the time for switching the changeover switch 25. Namely, in the switching operation from the first position (the battery 11 side) to the second position (the EHC 21a side), the ECU 30 switches the switch 25 when a predetermined time CS5 has lapsed after the power generation was terminated. However, in addition to that, the ECU 30 immediately switches the switch 25 when the electromotive force VS becomes lower than the battery voltage VB even though the time CS5 has not lapsed. Therefore, the switching is performed in the condition where the electric current flowing through the switch 25 becomes 0 even if the time CS5 has not lapsed. Further, if the switching is performed, the power generation is restarted when a predetermined time CR (i.e., the time required for completing the switching) has lapsed since the start of the switching.

In this embodiment, the switching operation of the changeover switch 25 from the second position (the EHC 21a side) to the first position (the battery 11 side) is performed also in the same manner. In this case, the switching is immediately performed when the electromotive force VS decreases to a predetermined value (for example, about 5 V) even if the predetermined time has not lapsed after the power generation is terminated. Therefore, the switching operation is immediately performed when the safety of the changeover switch 25 is secured (i.e., when the electric current flowing through the switch 25 becomes sufficiently low) even if the predetermined time has not lapsed after the power generation terminates.

In FIG. 15, steps 1503 through 1523 represent the switching operation from the first position (the battery 11 side) to the second position. At steps 1501 and 1503, similarly to the previous embodiments, the values of the flags EX and FC are determined. If EX=1 and FC≠1, the value of the flag FC is set to 1 and the value of the counter CS is set to a predetermined value CS5 and, further, the value of a counter CR (a counter for restarting the power generation) is set at a predetermined value CR5. In this embodiment, the values CS5 and CR5 are set at about 150 (ms) and about 100 (ms), respectively. After setting the values of the counters, the termination signal is supplied to the controller 40 in order to turn off the switching transistor 5a in the regulator 5.

The routine, then, determines whether the value of the counter CS reaches 0 at step 1509, i.e., whether the predetermined time CS5 has lapsed since the power generation was terminated and, if the time CS5 has not lapsed, the routine decreases the value of the counter CS by T0 at step 1511 (T0 is a time the same as the interval of the execution of the routine, and is 10 ms in this embodiment). After performing step 1511, the routine determines whether the electromotive force VS of the stator coils 32 becomes lower than or equal to the battery voltage VB at step 1513. If VS is higher than VB at step 1513, the routine holds the changeover switch 25 at the first position at step 1515, i.e., the switching is not performed. On the other hand, if VS≦VB at step 1513, the routine proceeds to step 1517 to switch the changeover switch 25 from the first position to the second position even though the time CS5 has not lapsed. Further, when the step 1517 is executed, the value of the counter CR is decreased by the value T0, and the high output voltage signal is generated (i.e., the power generation restarts) at step 1521 when the time CR5 has lapsed at step 1519.

Steps 1525 through 1545 in FIG. 16 represent the switching operation of the changeover switch 25 from the second position (the EHC 21a side) to the first position (the battery 11 side). The steps 1525 through 1545 are operations similar to those of steps 1503 through 1523. However, at step 1527, the value of the counter CS is set at a predetermined value CS6 which is longer than CS5 in step 1505 (for example, CS6 is about 250 (ms)). Further, at step 1535, the electromotive force VS is compared with a predetermined value V1 instead of the battery voltage VB. The value V1 corresponds to the electromotive force of the stator coils when the output current IA of the alternator 3 decreases to a sufficiently low value which allows the switching of the switch 25 without causing a failure (such as welding of the contacts) thereof and, in this embodiment, V1 is set at about 5 V.

If the time CS6 has lapsed, or when VS becomes lower than or equal to V1, power generation (in this case, the constant output voltage operation of the alternator 3) restarts at steps 1541 and 1545 when the time CR5 has lapsed.

When the switching operation is performed based on the field current IF or the rotor coil voltage VF, the switching operations are similar to those in FIGS. 15 and 16. In this case, the routine determines whether the field current IF or the rotor coil voltage VF becomes lower than or equal to a predetermined value IFB or VFB at step 1513, and determines whether the field current IF or the rotor coil voltage VF becomes lower than or equal to a predetermined value IF1 or VF1 at step 1535. The IFB and VFB represent a field current and a rotor coil voltage, respectively, when the electromotive force VS of the stator coils decreases to the minimum battery voltage, and, for example, the IFB is about 0.5 A and the VFB is about 5 V in this embodiment. The IF1 and VF1 represent a field current and a rotor coil voltage, respectively, when the electromotive force VS of the stator coils decreases to a sufficiently low value which allows the switching operation of the changeover switch 25 without causing the failure thereof, and, for example, IF1 is about 0.5 A and VF1 is about 5 V in this embodiment. According to the present embodiment, by determining the time for switching the changeover switch 25 based on the electromotive force VS of the stator coils, the changeover switch 25 is always switched in the condition where the electric current flowing through the switch 25 is sufficiently low and, thereby, the failure of the switch 25 does not occur.

I claim:

1. A control system for a power supply changeover switch comprising:

an electric generator;

a battery;

an electric load;

a changeover switch which selectively takes a first position which connects the battery to the generator and a second position which connects the electric load to the generator;

power supply control means for terminating a power generation of the generator when the switching of the changeover switch is required;

switching control means for determining, after the power supply control means terminates the power generation of the generator, whether an electric current flowing through the changeover switch is lower than a predetermined value and for permitting the switching of the changeover switch when, after the power supply control means terminates the power generation of the generator, the electric current becomes lower than the predetermined value; and switching means for switching the changeover switch between the first and the second positions when the switching control means permits the switching of the changeover switch.

2. A control system for a power supply changeover switch as set forth in claim 1, wherein the switching control means determines whether the electric current flowing through the changeover switch is lower than the predetermined value after a predetermined time has lapsed after the power supply control means has terminated the power generation.

3. A control system for a power supply changeover switch as set forth in claim 2, wherein the power supply control means further controls a field coil current of the generator at a constant value before terminating the power generation of the generator.

4. A control system for a power supply changeover switch as set forth in claim 2, wherein the switching control means adjusts the predetermined time in accordance with an output power of the generator immediately before the power supply control means terminates the power generation.

5. A control system for a power supply changeover switch as set forth in claim 1, wherein the switching means completes the switching of the changeover switch from the first position to the second position before a field coil current of the generator becomes lower than a predetermined value.

6. A control system for a power supply changeover switch comprising:

an electric generator;

a battery;

an electric load;

a changeover switch which selectively takes a first position which connects the battery to the generator and a second position which connects the electric load to the generator;

power supply control means for terminating a power generation of the generator when the switching of the changeover switch is required;

switching control means for determining, after the power supply control means has terminated the power generation, whether an electromotive force of the generator is lower than a voltage of the battery and for permitting the switching of the changeover switch from the first position to the second position when, after the power supply control means has terminated the power generation, the electromotive force is lower than the predetermined value; and switching means for switching the changeover switch between the first and the second positions, wherein the switching means switches the changeover switch from the first position to the second position when the switching control means permits the switching of the changeover switch.

7. A control system for a power supply changeover switch as set forth in claim 6, wherein the switching control means determines that the electromotive force of the generator is lower than the voltage of the battery when a field coil current of the generator becomes lower than a predetermined value.

8. A control system for a power supply changeover switch as set forth in claim 6, wherein the switching control means determines that the electromotive force of the generator is lower than the voltage of the battery when a field coil voltage of the generator is lower than a predetermined value.

* * * * *